US010990097B2

(12) United States Patent
Hwang et al.

(10) Patent No.: US 10,990,097 B2
(45) Date of Patent: Apr. 27, 2021

(54) COMPUTING DEVICE

(71) Applicant: LG ELECTRONICS INC., Seoul (KR)

(72) Inventors: Inyoung Hwang, Seoul (KR); Sanga Kim, Seoul (KR); Kyoungha Lee, Seoul (KR); Taeyoung Jeon, Seoul (KR); Kangmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 16/127,735

(22) Filed: Sep. 11, 2018

(65) Prior Publication Data
US 2019/0079519 A1 Mar. 14, 2019

(30) Foreign Application Priority Data

Sep. 12, 2017 (KR) .................. 10-2017-0116764

(51) Int. Cl.
*G05D 1/00* (2006.01)
*G06Q 10/04* (2012.01)
*G05D 1/02* (2020.01)
*G06Q 50/30* (2012.01)

(52) U.S. Cl.
CPC ......... *G05D 1/0088* (2013.01); *G05D 1/0212* (2013.01); *G06Q 10/04* (2013.01); *G06Q 50/30* (2013.01)

(58) Field of Classification Search
CPC .. G05D 1/0088; G05D 1/0212; G05D 1/0217; G05D 2201/0212; G06Q 10/04; G06Q 50/30
See application file for complete search history.

(56) References Cited

U.S. PATENT DOCUMENTS

| | | |
|---|---|---|
| 9,547,307 B1 | 1/2017 | Cullinane et al. |
| 2015/0330802 A1 | 11/2015 | Ono |
| 2015/0338852 A1 | 11/2015 | Ramanujam |
| 2015/0346727 A1 | 12/2015 | Ramanujam |
| 2016/0138924 A1* | 5/2016 | An .................. G01C 21/34 701/25 |
| 2016/0216126 A1* | 7/2016 | Park ............... G01C 21/3691 |
| 2016/0349750 A1 | 12/2016 | Nemec et al. |
| 2017/0028995 A1 | 2/2017 | Mori et al. |

(Continued)

FOREIGN PATENT DOCUMENTS

| | | |
|---|---|---|
| KR | 10-0312298 B1 | 10/2001 |
| KR | 10-2016-0057756 A | 5/2016 |

(Continued)

*Primary Examiner* — Donald J Wallace
(74) *Attorney, Agent, or Firm* — Birch, Stewart, Kolasch & Birch, LLP

(57) ABSTRACT

A method for controlling a computing device including registering a vehicle configured to provide a transportation service based on vehicle information received from a driver terminal; generating a regular route of the vehicle including first and second stops; transmitting information on the regular route to the driver terminal such that the regular route is displayed on a display of the driver terminal; and transmitting an autonomous driving command, in response to receiving an approval message to the regular route from the driver terminal, to the vehicle such that the vehicle performs an autonomous driving along the regular route.

26 Claims, 14 Drawing Sheets

(56) References Cited

U.S. PATENT DOCUMENTS

| | | | |
|---|---|---|---|
| 2017/0169366 A1* | 6/2017 | Klein | G06Q 50/30 |
| 2017/0192436 A1* | 7/2017 | Min | G01C 21/32 |
| 2018/0203455 A1* | 7/2018 | Cronin | B60W 50/14 |
| 2018/0211541 A1* | 7/2018 | Rakah | B60W 60/00253 |
| 2019/0064808 A1* | 2/2019 | Dyer | B60W 10/06 |
| 2019/0137290 A1* | 5/2019 | Levy | G01C 21/3461 |

FOREIGN PATENT DOCUMENTS

| | | |
|---|---|---|
| KR | 10-2016-0092660 A | 8/2016 |
| KR | 10-2017-0015238 A | 2/2017 |
| KR | 10-2017-0082165 A | 7/2017 |

* cited by examiner

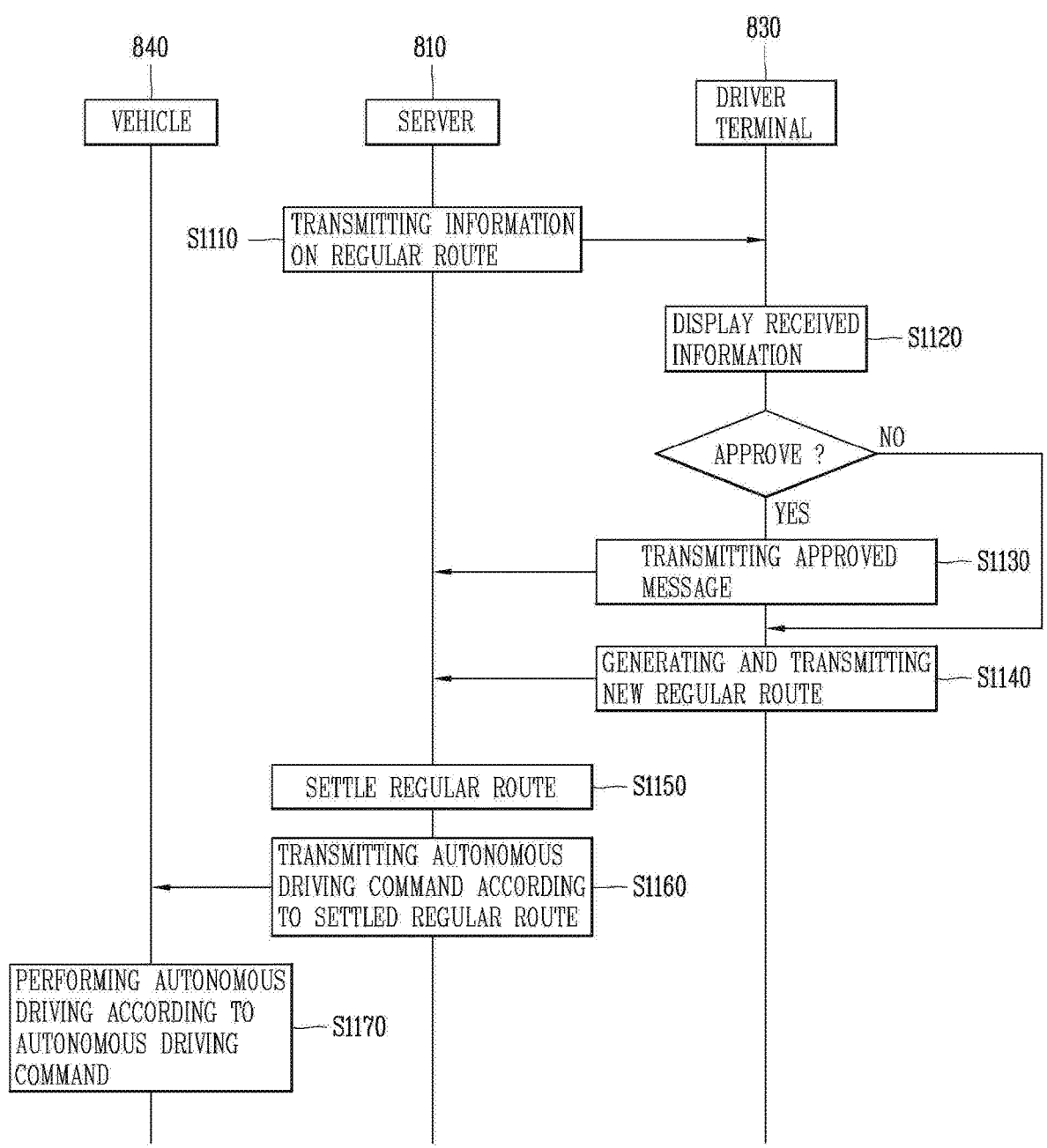

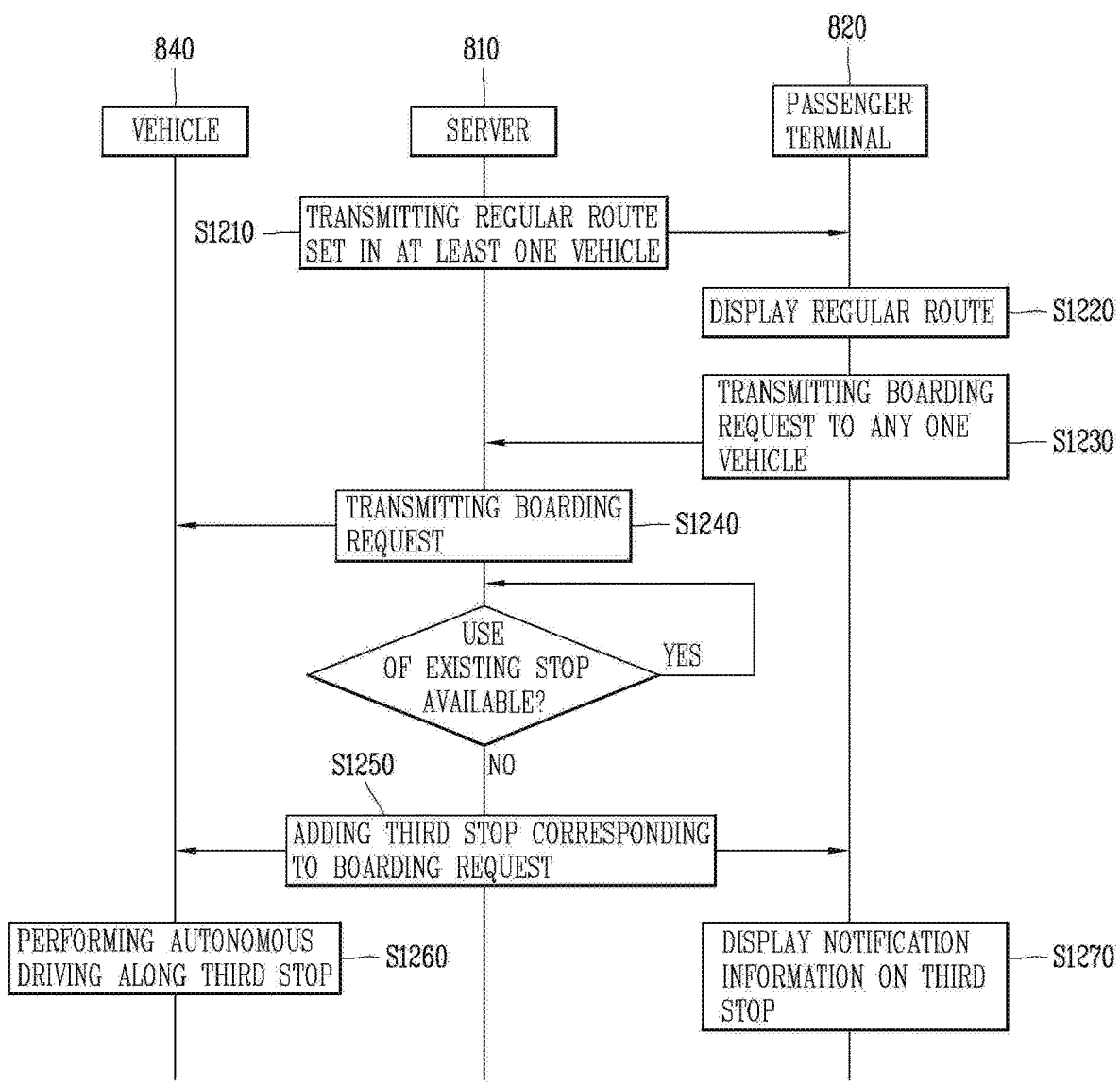

FIG. 10
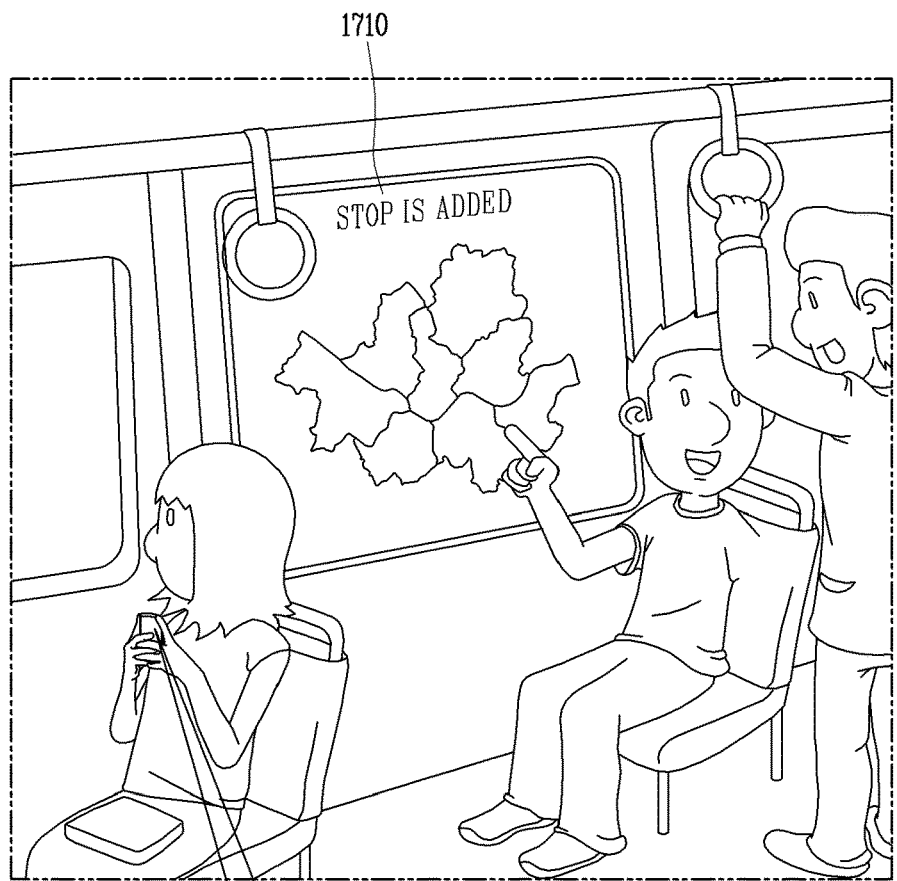
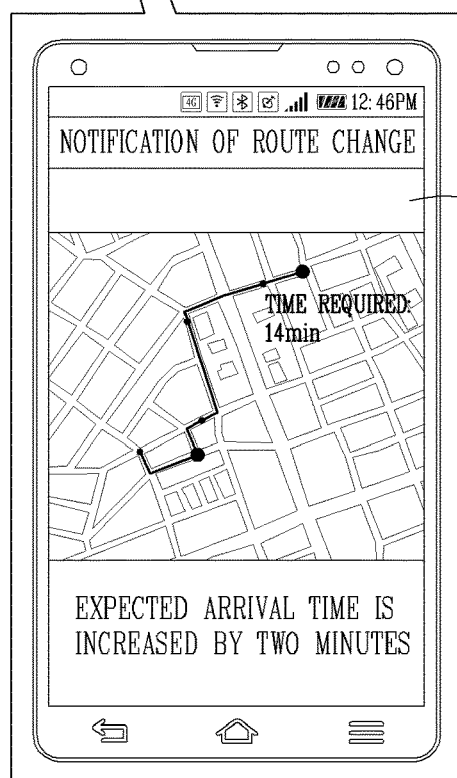

COMPUTING DEVICE

CROSS-REFERENCE TO RELATED APPLICATION

This application claims the benefit of Korean Application No. 10-2017-0116764 filed in the Republic of Korea on Sep. 12, 2017, the entirety of which is incorporated herein by reference.

BACKGROUND OF THE INVENTION

1. Field of the Invention

The present disclosure relates to a computing device included in a transportation system and, more particularly, to a computing device and a control method thereof which connect a driver and a passenger with each other.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality that supports game playing, while other terminals are configured as multimedia players. More recently, mobile terminals have been configured to receive broadcast and multicast signals that permit viewing of content such as videos and television programs.

Owing to an improvement of the mobile terminal, various sharing economic services are developed. The sharing economy means an economy to rent or lend goods, production facilities and services as much as needed.

A representative example of such a sharing economy is a transportation service. The transportation service means that a driver moves a passenger from a departure point to a destination using his/her vehicle. The transportation service as a sharing economy continues to develop to provide a relay between any driver who is a vehicle provider and any passenger who is a user of the vehicle.

The transportation service is provided by a transportation system that includes a passenger terminal, a driver terminal and a server that relays the passenger terminal and the driver terminal.

For instance, a passenger may order a vehicle to a specific place, using a passenger terminal, a server selects a driver who will provide a vehicle to the passenger and requests a reservation to the driver terminal of the selected driver. The driver terminal of the selected driver provides the request of the server to the driver such that a relay between the passenger and the driver may be performed.

In order for the transportation service to accomplish its role as a sharing economy, it should go forward from a simple connection between a passenger and a driver to make more people use one vehicle.

Further, various user interfaces have to be developed to provide convenience to each of passengers and drivers, together with a transportation service.

SUMMARY OF THE INVENTION

An object of the present disclosure is to provide a computing device and a control method thereof that can solve the above and other problems.

Another object of the present disclosure is to provide a computing device and a control method thereof that can provide a new type of transportation service.

Still another object of the present disclosure is to provide a transportation system including a mobile terminal.

Still another object of the present disclosure is to provide a mobile terminal and a method for controlling the same, capable of providing convenience not only to a passenger, but to a driver who provides a transportation service.

In order to accomplish the above and other objects in accordance with one aspect of the present disclosure, a control method for a computing device is provided. The control method may include: registering a vehicle that provides a transportation service based on vehicle information received from a driver terminal; generating a regular route of the vehicle including first and second stops; transmitting information on the regular route to the driver terminal such that the regular route is displayed on a display of the driver terminal; and transmitting, when an approval message on the regular route is received from the driver terminal, an autonomous driving command to the vehicle such that the vehicle performs an autonomous driving along the regular route.

According to another embodiment, a vehicle control method of an application that provides a transportation service may be provided. The control method may include: controlling the vehicle installed with the application such that movement and stops are repeatedly performed along a first route including first and second stops; searching a getting-off spot, when a getting-off request is generated by a passenger boarded in the vehicle, in response to the getting-off request; and controlling the vehicle to stop at the searched getting-off spot.

According to still another embodiment, a method for controlling a computing device that provides information on a transportation service to passenger terminals may be provided. The control method may include: registering a regular route including first and second stops of a vehicle; transmitting information on the regular route to at least one of the passenger terminals; adding, when a boarding request or a getting-off request with respect to the vehicle is received from at least one of the passenger terminals, a predetermined spot corresponding to the boarding request or the getting-off request to the regular route as a third stop; transmitting notification information that informs an addition of the third stop to the regular route to at least one of the passenger terminals; and transmitting an autonomous driving command to the vehicle such that the vehicle comes and goes along the first through third stops in a preset order.

According to one aspect of the present disclosure, a transportation system including the above described computing device may be provided.

According to the transportation system in accordance with the present disclosure, a server may generate a regular route based on the characteristics of any one registered vehicle, and control the any one vehicle to provide a transportation service along the regular route. In this instance, since at least one of a path, position and number of the stops is determined, the efficiency of the transportation service may be enhanced much more.

Further, a manager of a vehicle can provide a transportation service using his/her vehicle though he/she does not drive himself/herself, thereby creating a benefit through a sharing economy. Since it is possible to edit the regular route of the vehicle using a driver terminal owned by himself anytime and anywhere, convenience for a supplier who provides a transportation service can be enlarged more and more.

In providing a transportation service, the vehicle and/or the passenger terminal may provide various user interfaces such that a passenger can get off at a desired spot. The vehicle does not stop anywhere in response to a getting-off request, but may stop at a spot which is set as a getting-off spot from several spots where a passenger can get off, considering the passenger's safety without any legal problems. Since the getting-off spot may be varied depending on the vehicle and/or the passenger, user convenience can be increased more and more.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 4 is a flowchart illustrating operations of a vehicle before the vehicle starts an autonomous driving along a regular route according to an embodiment of the present disclosure;

FIG. 5 is a flowchart illustrating operations to add stops according to a passenger's boarding request according to an embodiment of the present disclosure;

FIG. 10 is a conceptual view illustrating a method to inform a new stop when the new stop is newly established according to an embodiment of the present disclosure;

DETAILED DESCRIPTION OF THE INVENTION

Figure 1:
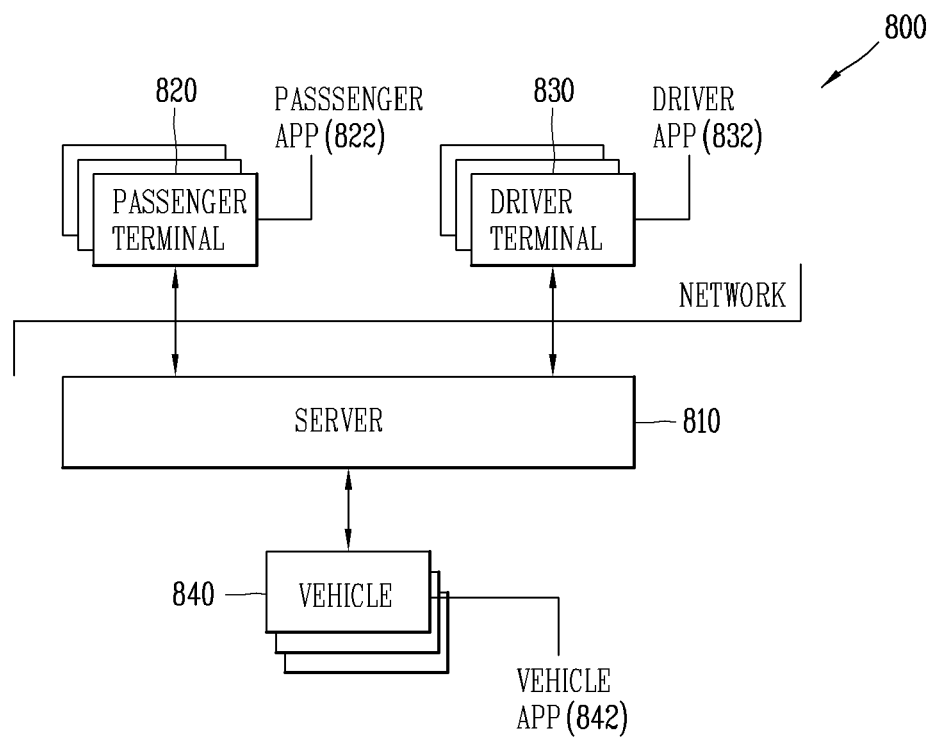
FIG. 1 is a conceptual view illustrating a transportation system according to an embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and it should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to an embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

A vehicle 100 may include wheels that are turned by a driving force, and a steering apparatus for adjusting a driving (ongoing, moving) direction of the vehicle 100. The vehicle 100 may be an autonomous vehicle. The vehicle 100 may be switched into an autonomous mode or a manual mode based on a user input. For example, the vehicle may be switched from the manual mode into the autonomous mode or from the autonomous mode into the manual mode based on a user input received through a user interface apparatus.

The vehicle 100 may be switched into the autonomous mode or the manual mode based on driving environment information. The driving environment information may be generated based on object information provided from an object detecting apparatus. For example, the vehicle 100 may be switched from the manual mode into the autonomous mode or from the autonomous module into the manual mode based on driving environment information generated in the object detecting apparatus.

In an example, the vehicle 100 may be switched from the manual mode into the autonomous mode or from the autonomous module into the manual mode based on driving environment information received through a communication apparatus. The vehicle 100 may be switched from the manual mode into the autonomous mode or from the autonomous module into the manual mode based on information, data or a signal provided from an external device.

When the vehicle 100 is driven in the autonomous mode, the autonomous vehicle 100 may be driven based on an operation system. For example, the autonomous vehicle 100 may be driven based on information, data or a signal generated in a driving system, a parking exit system and a parking system.

When the vehicle 100 is driven in the manual mode, the autonomous vehicle 100 may receive a user input for driving through a driving control apparatus. The vehicle 100 may be driven based on the user input received through the driving control apparatus.

At least one processor provided at the vehicle 100 generates 'vehicle driving information'. The vehicle driving information includes vehicle information and vehicle surrounding information. Information on an inside of a vehicle based on a frame of the vehicle 100 may be defined as vehicle information, and information on an outside of the vehicle based on a frame of the vehicle 100 may be defined as surrounding information.

The vehicle information may mean information on the vehicle itself. For instance, the vehicle information may include a driving speed, driving direction, acceleration, angular velocity, GPS (Global Positioning System), weight, number of passengers, braking force, maximum braking force, pneumatic of each wheel, centrifugal force, driving mode (autonomous driving or manual driving), and parking mode (autonomous parking, automatic parking, or manual parking) of a vehicle, whether a user is boarded in a vehicle, and information related to a user.

The surrounding information means information on an object positioned within a predetermined range based on a vehicle and information related to the outside of a vehicle. For instance, the surrounding information may include a condition of the road surface (frictional force) where a vehicle is driving, weather, a distance from a front (or rear) vehicle, a relative velocity of a front (or rear) vehicle, a curvature of a curve when a lane where a vehicle is driving is curved, a brightness of surroundings of a vehicle, information on an object existing in a reference region (a predetermined region) based on a vehicle, whether an object enters into/escapes from a predetermined region, whether a user exists around a vehicle, and information (for instance, whether the user is authenticated) related to the user.

Further, the surrounding information may include a brightness of surroundings, the temperature, the position of the sun, information on an ambient object (a person, another vehicle, a sign, etc.), the type of a road surface where a vehicle is driving, the landmark, line information, driving lane information, and information required for an autonomous driving/an autonomous parking/an automatic parking/a manual parking mode.

Furthermore, the surrounding information may further include a distance from the vehicle 100 to an object existing around the vehicle 100, the possibility of collision, a type of the object, a parking space where a vehicle is allowed to be parked, an object for identifying the parking space (for example, a parking line, a string, another vehicle, a wall, etc.), and the like.

The vehicle driving information is not limited to the examples as described above, and may include all information generated from components provided in the vehicle 100.

FIG. 1 is a conceptual view illustrating a transportation system 800 in accordance with the present disclosure. The transportation system 800 includes a server 810, a passenger terminal 820 installed with a passenger application 822, a driver terminal 830 installed with a driver application 832, and a vehicle 840 installed with a vehicle application 842.

The passenger terminal 820 and/or the driver terminal 830 described in the present disclosure may include a mobile terminal, a smart phone, a laptop computer, a terminal for digital broadcasting, PDA (Personal Digital Assistant), PMP (Portable Multimedia Player), a navigation, a slate PC, a tablet PC, an ultra book, and a wearable device (for instance, a watch-type terminal (smart watch), a glass-type terminal (smart glass), HMD (Head Mounted Display), and the like). However, it will be noted for a person in the art that the combination described in the description of the present embodiment may be applicable to a fixed terminal, such as a digital TV, a desktop computer, and a digital signage. The terminal may mean at least one of the passenger terminal 820 and the driver terminal 830.

In addition, a control method for a transportation system as described hereinafter may be performed through an application provided at the passenger terminal 820 and the driver terminal 830, respectively. Specifically, an operation of the passenger terminal 820 may be executed by the passenger application 822, and an operation of the driver terminal 830 is executed by a driver application 832.

The server 810, the passenger terminal 820 and the driver terminal 830 may be briefly referred to as a 'computing device' that will perform various embodiments (or, control methods) which will be described hereinafter.

The transportation system 800 is configured to provide a transportation service to any passenger through any driver. A reservation, relay, contact, transportation, and a driver evaluation may be performed through the transportation system 800.

The reservation of a transportation service means that a passenger requests a vehicle to a departure point using the passenger terminal 820. Such a request is referred to as a 'vehicle request', and the vehicle request is transmitted to the server 810.

The vehicle request may include a departure point, a destination where a passenger wants to move, a type of a vehicle that a passenger wants to use, and the type of service. That is, the vehicle request includes a condition of the vehicle request, and the server 810 searches a candidate vehicle that complies with the condition of the vehicle request and transmits a reservation request to the searched candidate vehicle.

The departure point may be a spot set by a passenger, or a spot corresponding to at least one of plural stops set at a vehicle. Also, the destination may be a spot set by a passenger, or a spot corresponding to at least another of plural stops set at a vehicle.

The type of vehicle may include a type related to the vehicle itself and a type related to objects included in the vehicle. The type of vehicle related to the vehicle itself may be a two-seater, a four-seater and a convertible, and the type related to objects may be refrigerator, a wheelchair and an umbrella. For instance, when a request for a two-seater including a refrigerator is received, the server searches a vehicle satisfying the type of vehicle.

The type of service may mean a service provided though a vehicle. This may include an exclusive service that a vehicle is exclusively used, and a joint service that a vehicle is shared with any third party.

In the present description, a riding together is called ride-sharing, but may be referred to as vehicle-sharing, car-sharing, and a carpool.

The relay means that the server 810 assigns at least one vehicle to one passenger who requests a vehicle in response to the vehicle request. Specifically, the server 810 searches one or more driver terminals which are located within a predetermined range based on a position of the passenger terminal 820, and requests a reservation to the searched driver terminal 830. Such a request is called a 'reservation request'. Thereafter, when any one driver terminal 830 approves the reservation request, a relay between the driver terminal 830 and the passenger terminal 820 is performed. By the relay, a connection between the driver terminal 830 and the passenger terminal 820 is accomplished, and various information for providing a service is shared. For instance, the location of each terminal may be shared.

The contact means a meeting between the relayed passenger and the driver. From when the relay is accomplished to before a boarding is performed, various functions for the contact are executed at the passenger terminal 820 and the driver terminal 830. For instance, a path to move from the driver terminal to the departure point may be output to the driver terminal 830, and the remaining time that is required for the vehicle to reach the departure point may be output to the passenger terminal 820.

The transportation means a movement from a departure point to a destination after a boarding is accomplished. A passenger may change a route to the destination using his passenger terminal 820 while moving, or the destination itself, and set a transit. In this instance, the passenger terminal 820, the server 810 and the driver terminal 830 organically operate so that a path may be changed and a transportation service through the changed path may be provided.

The driver evaluation means an evaluation performed by a passenger while moving or after getting off. For instance, a user interface may be output to the passenger terminal 820, which can evaluate the driver while moving or after getting off. When a passenger evaluates a driver via the passenger terminal 820, the server 810 stores the evaluation of the driver, and may classify the drivers using the stored big data.

Each component of the transportation system 800 is organically combined with each other to process the position information generated at each terminal, and may provide a transportation service using the position information. Each component 810-830 of the transportation system 800 transceives data with each other component through a network, and organically interwork to perform various functions related to a transportation service.

The logic of the transportation service may be performed by various applications and/or hardware installed in each component. For instance, the operations of the passenger terminal 820, which will be described hereinafter, may be executed through the passenger application 822, and the operations of the driver terminal 830 may be executed through the driver application 832.

The server 810 is configured to relay the passenger terminal 820 and the driver terminal 830. The server 810 may include a passenger database, a driver database, and a map database.

When a vehicle request is received from the passenger terminal 820, the server 810 may select one or more driver terminals satisfying a predetermined condition based on a position of the passenger terminal 820, and transmit a reservation request to the selected driver terminal. In this instance, a driver terminal that is located within a predetermined distance from the departure point, or a driver terminal that can move to the departure point within a predetermined time may be selected.

When any one driver terminal 830 that receives a reservation request approves the reservation request, the passenger terminal 820 and the driver terminal 830 execute functions that are preset to make a contact between the passenger terminal 820 and the driver terminal 830, respectively. In order to execute the preset functions, the passenger terminal 820 and the driver terminal 830 may directly transceive their position information or indirectly transceive through the server 810.

The passenger terminal 820 may output a position of a vehicle and a time required to reach a departure point. Further, the driver terminal 830 may output a path notification information that guides a vehicle to a departure point. A movement path of a vehicle may be calculated by the server 810 or the driver terminal 830.

When a passenger is boarded in a vehicle, the driver terminal 830 and/or the passenger terminal 820 may transmit a boarding report to the server 810. Thereafter, a transportation service is performed to the destination, and the expense of transportation is calculated by at least one of a distance of transportation and a time of transportation. The expense may be differently calculated depending upon a type of a vehicle provided to the transportation and/or a type of service. The calculated expense is paid by a preregistered credit card or e-money.

The transportation system 800 may control a vehicle 840 which is registered via the driver terminal 830, through the vehicle application 842 installed in the vehicle 840. The vehicle 840 means a vehicle that can execute an autonomous driving. And 'registration' means that an owner of a driver terminal opens his right to his vehicle to the server 810 such that his vehicle provides a transportation service under the control of the server 810. For instance, when a first vehicle is registered through a first driver terminal, the server 810 may remote control an autonomous driving of the first vehicle such that the first vehicle may provide a transportation service, and share various information generated by a remote control with the first driver terminal.

One or more vehicles may be registered in one driver terminal, and the registered one or more vehicles may be controlled through a driver terminal that performs the registration, or controlled by the server 810. The driver application 832 may provide a user interface for registering a vehicle, and a user interface for remotely controlling a vehicle.

Figure 2:
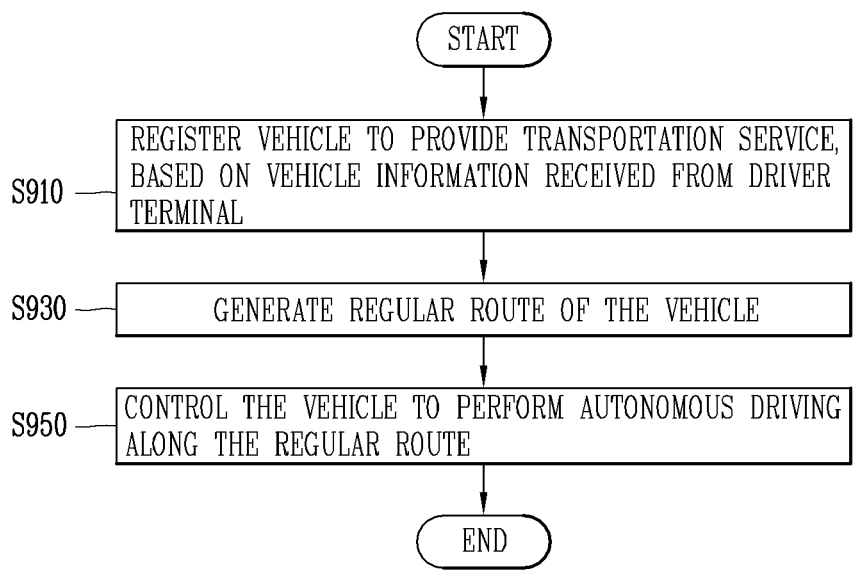
FIG. 2 is a flow chart illustrating a representative control method executed in a server of FIG. 1 according to an embodiment of the present disclosure.
Figure 3A:
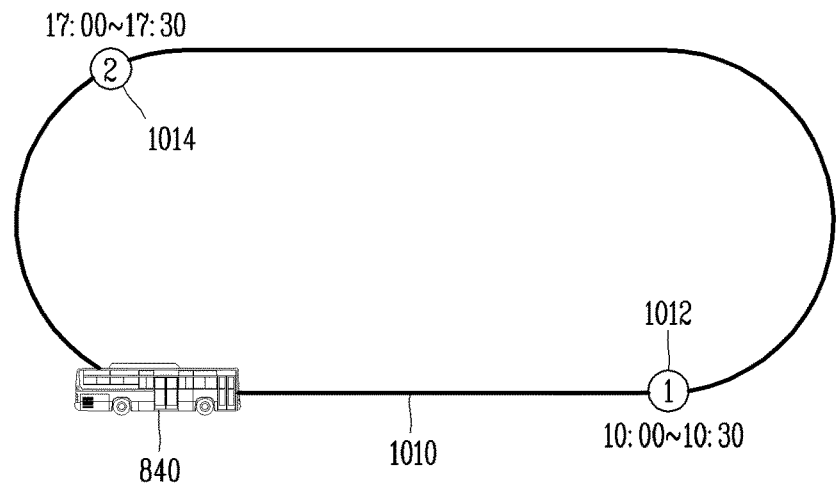
FIGS. 3A and 3B are conceptual views illustrating the control method of FIG. 2 according to an embodiment of the present disclosure.
Figure 3B:
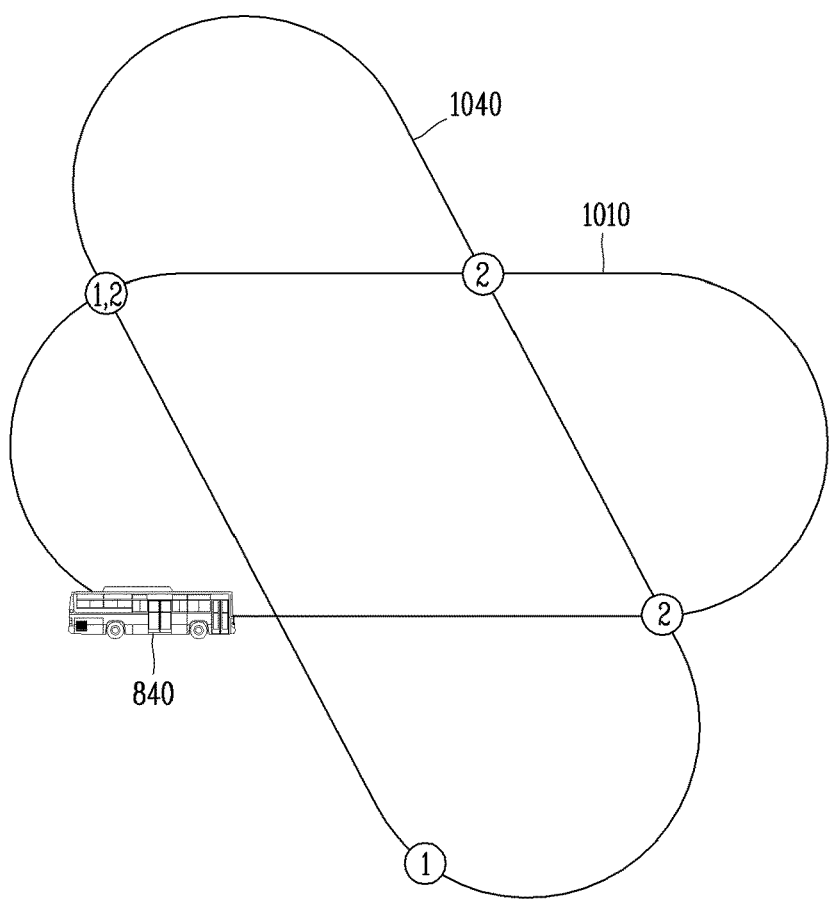

A transportation service provided through the transportation system 800 as described above will be described in detail with reference to FIGS. 2, 3A and 3B. FIG. 2 is a flow chart illustrating a representative control method executed in a server of FIG. 1, and FIGS. 3A and 3B are conceptual views illustrating the control method of FIG. 2.

The computing device installed in the server 810 carries out each process shown in FIG. 2.

First, the server 810 registers a vehicle that will provide a transportation service based on vehicle information received from the driver terminal 830 (S910). The vehicle information is transmitted from the driver terminal 830 to the server 810, and the vehicle information may include at least one of a type of the vehicle 840, a vehicle number of the vehicle 840, information on sensors provided in the vehicle 840, a communication code for communicating with the vehicle 840, and an authentication key for remote controlling the vehicle 840.

Moreover, the vehicle information may include exclusive time information that is set such that a driver may exclusively use the vehicle 840 and/or sharing time information that is set to share the vehicle 840. The server 840 may generate a schedule of the vehicle 840, using the exclusive time information and/or the sharing time information.

For instance, when a driver uses the vehicle for the purpose of commute, the time for work and the closing time may be set as an exclusive time zone that the vehicle 840 is exclusively used by the driver. In this instance, the server 810 can not remotely control the vehicle 840 during the exclusive time zone, but may remotely control the vehicle 840 in the remaining time zone except the exclusive time zone. In another instance, when a sharing time zone is set, the server 810 may remotely control the vehicle 840 only for the time that is set as the sharing time zone. The generated schedule may be edited by a user input which is input to a user interface provided in the driver terminal 830, or a new schedule which is different from the generated schedule may be generated.

Next, the server 810 may generate a regular route of the vehicle 840 (S930). The server 810 may generate a regular route that provides a transportation, using the vehicle 840. More specifically, the regular route means a preset path including first and second stops, and the vehicle 840 performs an autonomous driving such that movement and stopping are repeatedly performed along the regular route.

The regular route includes first and second stops. The first and second stops may be a reference point where the vehicle 840 repeatedly circulates. For instance, as shown in FIG. 3A, a first regular route corresponding to a first path 1010 may be generated with respect to the vehicle 840. The first regular route may include a first stop 1012 and a second stop 1014.

The server 810 may generate an operation schedule of the first regular route, when generating the first regular route. According to the operation schedule, different arrival times may be set to each of the stops included in the first regular route. For instance, as shown in FIG. 3A, the vehicle 840 may make a stop from ten (10) o'clock sharp to ten thirty at the first stop 1012, and from seventeen (17) o'clock to seventeen thirty at the second stop 1014.

When the vehicle 840 moves from the (n)th stop to the (n+1)th stop, the server 810 and/or the vehicle 840 may adjust a speed of the vehicle 840 such that the vehicle 840 arrives at the (n+1)th stop at a set arrival time (where 'n' is a natural number). When the operation schedule is generated, the vehicle 840 adjusts a speed in line with the operation schedule, and arrives at each stop at a determined time. Thus, the number of operations of the regular route is preset. Further, when the operation schedule is not generated, the vehicle 840 arrives at each stop at an arbitrary time, and the operation time of the regular route may be varied according to the traffic condition.

In addition, when the departure point and destination are received through the driver terminal 830, the server 810 may set a first stop using the departure point, and a second stop using the destination. And the server 810 may search a path for going and coming back the first and second stops. The searched path and the first and second stops constitute the regular route, the vehicle 840 is operated along the path and may be operated again after stopping at the first and second stops along the path.

The server 810 may extract any spots as the first and second stops based on the big data accumulated in the server 810. In other words, the server 810 may set any spots for generating a route of the vehicle 840 as the first and second stops, though they are not input by a user. For instance, when an area where a transportation service is provided through the driver terminal 830 is received, the server 810 may extract plural spots where there are lots of transportation service requests in the area, and set the extracted spots as the first and second stops.

In addition, there may be many types of roads where the vehicle 840 will be driving, and also there may be a road where an entry is allowed or not according to a type of the vehicle 840. Moreover, various prohibition matters may be set to a road according to the law, and there may be a road where stopping is not allowed for a predetermined time, a road where an autonomous driving is not allowed, and a road that can not be used as a stop.

The server 810 may calculate a path that circulates a departure point and a destination, considering the characteristics of the vehicle 840 and the characteristics of a road constituting the regular route, and at least one stop that is located on the path and satisfies a preset condition. And the server 810 may generate the regular route, using the paths and the extracted stops.

The path may be varied according to the vehicle 840, and the position and number of the stops included in the regular route may also be varied. This is because the road that an operation is allowed and the road that stopping is allowed are varied when the vehicle is a 45-seater bus and a two-seater electric vehicle.

Further, the path of the regular route may be varied according to a weekday. Since the server 810 has a history of users using the transportation service, it is possible to calculate different paths that a use rate (an earning rate) is maximized according to a weekday. The path is differently calculated according to a weekday when the vehicle 840 executes an autonomous driving, and as the path is varied, the stop that is added to the regular stop may be varied.

For instance, as shown in FIG. 3B, the vehicle 840 may execute an autonomous driving along a first regular route corresponding to the first path 1010 on a weekday, and may execute an autonomous driving along a second route corresponding to the second path 1040 on a weekend. As the path is changed, at least one of the position and number of stops where a stop is executed may be varied.

In addition, the regular route may include at least two stops. After the path is calculated, at least one stop satisfying a preset condition on the path may be calculated. Specifically, the server 810 extracts an area where the vehicle 840 is allowed to stop for a predetermined time on the path. The stopping-allowed area may be one region connected, or plural regions spaced apart from each other. And the stopping-allowed area may be varied according to a country, city and path.

The server 810 extracts 'm' stops, using the stopping-allowed area. For instance, it is possible to extract stops on the path at a regular interval. For instance, when 'm' is 10 and a path distance between a departure point and a destination is 10 km, one stop may be extracted every 1 km, and when "m" is 20, one stop may be extracted every 500 m.

In another instance, the server 810 may extract 'm' stops such that a (n+1)th stop included in the regular route may be located beyond a predetermined range based on a (n)th stop. In this instance, the 'm' may be a natural number larger than 2, and the 'n' may be a natural number smaller than the 'm'. When three stops are extracted, a second stop may be set to be located over 1 km from a first stop on the path, and a third stop may be set to be located over 1 km from the second stop.

The 'm' and/or the predetermined range may be varied according to the path. For instance, when a distance between a departure point and a destination is less than 10 km, five stops may be extracted, and when a distance between a departure point and a destination is 10 km~20 km, 10 stops may be extracted. In another instance, a first predetermined range may be set such that more stops may be generated in a tourist area, while in a non-residence area where people does not reside in like a desert, a second predetermined range may be set such that a stop is not generated.

The preset condition that extracts a stop may be varied according to a type of the vehicle 840. Specifically, the server 810 selects any one condition among preset conditions according to a type of the vehicle 840, and extracts a stop according to the selected any one condition. At least two stops and a regular route including a path towards each stop may be stored and managed in the database of the server 810.

Next, the server 810 controls the vehicle 840 to perform an autonomous driving along the regular route (S950). Specifically, the server 810 may transmit the regular route to the vehicle 840, and then transmit an autonomous driving command such that the vehicle 840 may perform an autonomous driving along the regular route.

The vehicle 840 goes and comes back to the stops included in the regular route in line with the preset order. In this instance, the vehicle 840 performs an autonomous driving, and either starts an operation along the regular route according to a control command of the server 840, or returns to a garage after stopping the operation, or updates the regular route.

The vehicle 840 may transmit driving information to the server 810 while performing an autonomous driving along the regular route. The server 810 may monitor to check whether a transportation service by the vehicle 840 is well offered using the vehicle driving information, and remotely control the vehicle 840 when a problem occurs.

As described above, the server 810 of the transportation system 800 according to the present disclosure may generate a regular route based on the characteristics of a vehicle, and control a vehicle to offer a transportation service along a regular route. In this instance, since at least one of a path, a position and the number of stops is determined, the efficiency of the transportation service can be enhanced.

FIG. 11 is a flowchart illustrating operations of a vehicle before the vehicle starts autonomously driving along a regular route.

When a regular route is generated according to the method as described in FIG. 2, the server 810 transmits information on the generated regular route to the driver terminal 830 (S1110). The information on the regular route may include at least one of a path according to the regular route, a location of a stop included in the regular route, a schedule of the vehicle 840 on each stop, and the expected benefit and cost when the vehicle 840 is operated along the regular route.

The driver terminal 830 displays information received from the server 810 (S1120). The driver terminal 830 may display information on the regular route through an execution screen provided from the driver application 832.

As the regular route is automatically generated by the server 810, an approval from a manager of the vehicle 840 has to be made to operate the vehicle 840 along the regular route. Thus, the driver terminal 830 may provide a user interface for confirming or rejecting the approval of the regular route. For instance, a popup window for selecting "Yes" or "No" may be displayed on the display of the driver terminal 830. When an approval is made to the regular route, the driver terminal 830 transmits an approval message to the server 810 (S1130).

Further, when an approval to the regular route is not made, cancelled, or an edition is required, the driver terminal 830 may provide a user interface that can edit the regular route. And it is possible to edit the regular route, or generate a new regular route based on a user input. For instance, a map image and a path image to inform a path of the regular route may be displayed together. A graphic object for informing a stop may be additionally displayed on the map image. The driver terminal 830 may generate a new regular route by changing a path, deleting an existing stop, changing a location of an existing stop, or adding a new stop, based on a touch input. The generated new regular route may be transmitted to the server 810.

The driver terminal 830 transmits the approval message or the generated new regular route to the server 810. The server 810 settles a regular route based on the information received from the driver terminal 830 (S1150). Specifically, when the approval message is transmitted, the existing regular route is settled, and when the new regular route is transmitted, the new regular route is settled instead of the existing regular route.

Next, the server 810 transmits an autonomous driving command according to the regular route that is newly settled to the vehicle 840 (S1160). And the vehicle 840 performs an autonomous driving according to the autonomous driving command (S1170).

In addition, the driver terminal 830 and/or the server 810 may generate a new second regular route based on a user input, while an autonomous driving is performed along a first regular route. In this instance, the server 810 transmits an autonomous driving modification command to the vehicle 840 such that the vehicle performs an autonomous driving along the second regular route.

A manager of the vehicle 840 may set an initial value, using the driver terminal 830. The initial value means minimum conditions for generating the regular route, and may mean an area where the regular route is generated and vehicle information on the vehicle 840. The server 810 may generate the regular route of the vehicle 840 based on the initial value, and the generated regular route may be edited by the driver terminal 830. Once the regular route is settled, the vehicle 840 performs an autonomous driving along the regular route.

As described above, a manager of the vehicle 840 may provide a transportation service using the vehicle though he does not drive his vehicle by himself, and thus creating profits through a sharing economy. Further, since it is possible to edit the regular route of the vehicle 840 using the driver terminal 830 owned by himself, convenience for a supplier who provides a transportation service may be highly enhanced.

When the vehicle 840 performs an autonomous driving, or an autonomous driving is reserved, the server 810 may provide information on the regular route of the vehicle 840 to at least one of the passengers registered in the transportation system such that a transportation service using the vehicle 840 may be provided to passengers.

Hereinafter, a method for relaying a passenger and a vehicle will be described in detail with reference to FIGS. 5, 6A and 6B.

Figure 6A:
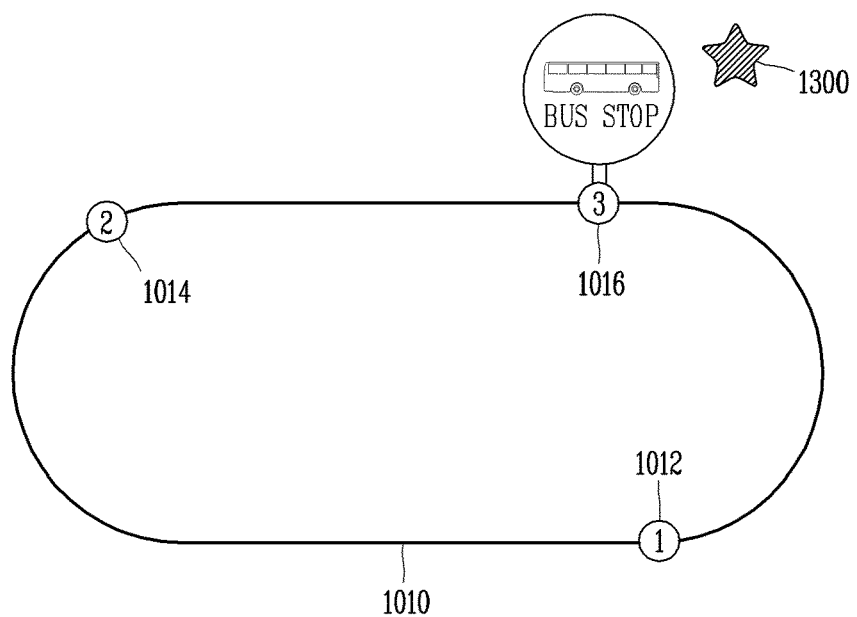
FIGS. 6A and 6B illustrate exemplary views of operations of FIG. 5 according to an embodiment of the present disclosure.
Figure 6B:
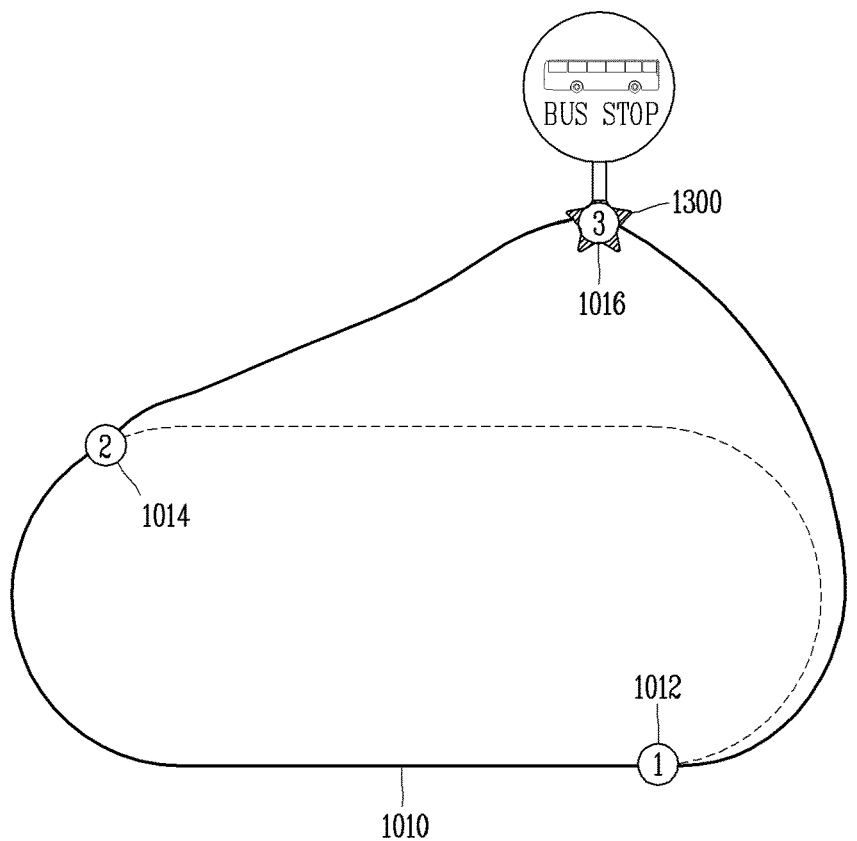
Figure 12:
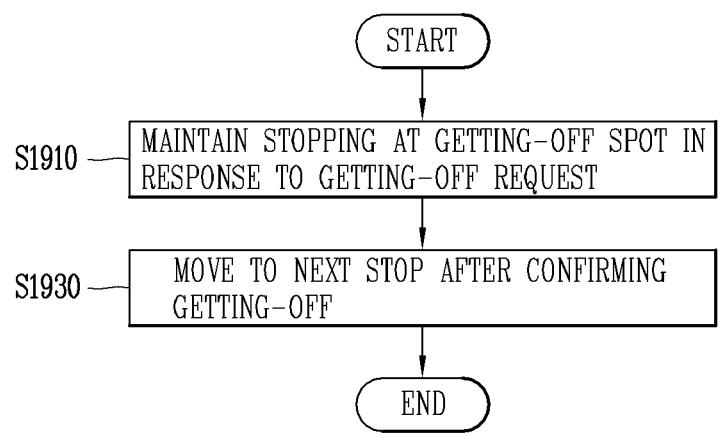
FIG. 12 is a flowchart illustrating an operation of a vehicle at a getting-off spot according to an embodiment of the present disclosure.

FIG. 5 is a flowchart illustrating operations to add stops according to a passenger's boarding request, and FIGS. 6A and 6B are exemplary views of operations of FIG. 12.

The server 810 transmits a regular route set in at least one vehicle to the passenger terminal 820 (S1210). For instance, the passenger terminal 820 may display an execution screen of the passenger application 822 in response to a user request. In this instance, the passenger terminal 820 may request regular route information that can be used at a specific area or moved to a predetermined destination, to the server 810. The predetermined area and/or the predetermined destination may be varied according to a location of the passenger terminal 820, and also may be varied according to a user input that is input to the passenger terminal 820.

The server 810 searches a regular route that may be used at the predetermined area in response to the passenger terminal 820, and transmits information on the searched regular route to the passenger terminal 820. The passenger terminal 820 may display at least one regular route based on the information received from the server 810 (S1220). For instance, the passenger terminal 820 may display an execution screen of the passenger application 822 that includes a map image on which a stop icon informing a stop that may be used by a user of the passenger terminal 820 may be displayed. The user of the passenger terminal 820 may acquire a regular route to be used by himself by scrolling the map image, or inputting a departure point and/or a destination, from the server 810.

Next, the passenger terminal 820 may transmit a boarding request with respect to any one vehicle to the server 810 (S1230). For instance, the passenger terminal 820 may set at least one of a departure stop and a destination stop based on a user input, and may transmit a vehicle request message to the server 810 to request a transportation service.

The server 810 searches any one vehicle corresponding to the vehicle request message, and assigns the searched vehicle to the passenger terminal 820. In other words, the server 810 may select any one vehicle that will provide a transportation service to a user of the passenger terminal 820. When the vehicle 840 is selected as the any one vehicle, the server 810 transmits a boarding request with respect to the vehicle 840 to the vehicle 840 (S1240).

As shown in FIGS. 6A and 6B, described will be a case where a first regular route corresponding to a first stop 1012 is set to the vehicle 840, and the first regular route includes the first stop 1012 and a second stop 1014.

Next, the server 810 determines whether a passenger who generates the boarding request can use an existing stop included in the first regular route of the vehicle 840. Specifically, the server 810 may determine whether a passenger can board at any one of the first and second stops 1012 and 1014.

For instance, according to whether or not it is possible to move from a location where the passenger terminal 820 is positioned to the existing stop within a predetermined time on foot, it is possible to determine a possibility of using an existing stop. In another instance, it is possible to determine whether or not using an existing stop is possible according to an amount of a baggage of a passenger, an age of a passenger, or whether a passenger is disabled or non-disabled. When it is possible to use an existing stop, the server 810 controls the vehicle 840 such that a user of the passenger terminal 820 may board in the vehicle 840 at the existing stop.

Further, when it is not possible to use an existing stop, the server 810 may add a third stop corresponding to the boarding request to the first regular route of the vehicle 840 (S1250). The server 810 may add a predetermined spot corresponding to the boarding request to the first regular route as a third stop. Specifically, the server 810 may search at least one candidate stop within a reference range based on a predetermined spot included in the boarding request. And it is possible to add any one among the searched candidate stops to the regular route as a third stop. The predetermined spot may be a departure point set by a user of the passenger terminal 820, or the current position of the passenger terminal 820.

The server 810 may classify the reference range into a stopping-allowed area where the vehicle 840 is allowed to stop for a predetermined time and a stopping-unallowed area where the vehicle 840 is not allowed to stop for a predetermined time. In this instance, the stopping-allowed area and/or the stopping-unallowed area may be varied according to a type of the vehicle 840 and the user characteristics of the passenger terminal 820.

And the server 810 may extract one spot of the stopping-allowed area as a candidate stop. In order to minimize a movement of a user of the passenger terminal 820, a spot where a distance of movement from a predetermined spot on the stopping-allowed area is shortest may be set as a candidate stop.

When plural candidate stops are searched, the server 810 may transmit information on the candidate stops to the passenger terminal 820 such that any one of the plural candidate stops may be selected. The passenger terminal 820 may provide a list of the candidate stops, and select any one candidate stop based on a user input and transmit it to the server 810. The selected any one candidate stop is added as a third stop.

In addition, the server 810 may transmit different messages to the passenger terminal 820 according to whether or not the candidate stops are searched. Specifically, when a candidate stop is not searched within a reference range based on the predetermined spot, a no stop addition message may be transmitted to the passenger terminal 820, and when a candidate stop is searched, a notification message informing the searched stop may be transmitted to the passenger terminal 820. When the no stop addition message is received, a user of the passenger terminal 820 may search with another search condition, and when the notification message is received, the user of the passenger terminal 820 may board in the vehicle 840 at the newly set third stop.

In addition, the server 810 may add, in adding the third stop, one spot on the first path as the third stop without changing the first path included in the first regular route of the vehicle 840. For instance, as shown in FIG. 6A, the boarding request may be received at a predetermined spot 1300. In this instance, the server 810 may search one spot where it is possible to most quickly (or, most conveniently) move from the predetermined spot on the first path 1010, and add the searched one spot as the third stop 1016.

In another instance, as shown in FIG. 6B, the server 810 may add one spot 1016 within a reference range based on the predetermined spot 1300 as the third stop, irrespective of the first path 1010. And the server 810 may calculate a second path 1011 including the first through the third stops, and control the vehicle to perform an autonomous driving along the second path 1011, not the first path 1010.

When the third stop is added to the first regular route, the server 810 may transmit an autonomous driving modification command to the vehicle 840 such that the vehicle 840 may go and comeback along the first through third stops in the preset order. The vehicle 840 may modify the driving route in response to the autonomous driving modification command and perform an autonomous driving along the modified path (S1260).

Moreover, the server 810 may transmit a notification message informing addition of the third stop to the first regular route of the vehicle 840 to the passenger terminal 820, and the passenger terminal 820 may display the notification information (S1270).

When the third stop is added to the regular route, the vehicle 840 goes and comes back along the first through third stops in the preset order. That is, a new stop is added to the first regular route. As the server 810 offers information on the third stop to another passenger terminal registered in another transportation system, a new transportation service using the third stop is started.

According to the present disclosure, as an autonomous driving vehicle and a passenger are connected in real time and a new stop is promptly established, a transportation service may be more efficiently provided and new profit may be created.

In addition, the server 810 may update the regular route of the vehicle 840 based on the big data accumulatively stored therein. The server 810 records the number of persons using each stop with respect to the regular route of the vehicle 840, and calculates a use rate based on the recorded information.

Figure 7:
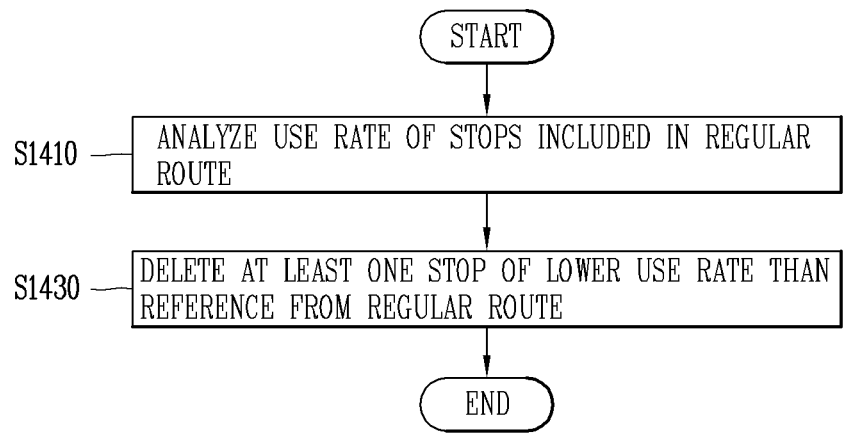
FIG. 7 is a flowchart illustrating a control method to update a regular route according to an embodiment of the present disclosure.

FIG. 7 is a flowchart illustrating a control method to update a regular route.

The server 810 may analyze the use rate of the stops included in the regular route of the vehicle 840 (1410). It is possible to analyze the use rate by weekdays and by times, and to extract a weekday and/or time with respect to at least one stop where the use rate is lower than a reference.

Next, the server 810 may delete at least one stop where the use rate is lower than a reference from the regular route (1430). In other words, when the number of persons using the third stop is lower than a reference for a predetermined time, the third stop may be deleted from the regular route. For instance, when the use rate of the third stop is lower than a reference, the third stop may be completely deleted from the regular route. In this instance, the vehicle 840 goes and comes back autonomously along the first and second sops in a preset order.

In another instance, only when the use rate of the third stop is lower than a reference in a specific time of a specific weekday, it is possible to delete the third stop from the regular route for a certain period only such that the vehicle 840 does not stop at the third stop at the specific time of the specific weekday.

The server 810 may analyze not only the use rate of each stop, but that of the regular route itself. When the number of persons using the regular route is lower than a maximum reference, the server 810 may transmit a standby command to the vehicle 840 such that the vehicle 840 does not perform an autonomous driving and stop at a predetermined spot.

That is, the vehicle 840 may perform an autonomous driving only when there are uses more than a predetermined level, but may wait at a predetermined spot when there is not a use.

Also it is possible to delete at least one stop from the regular route or update according to an earning rate that is defined by earnings on expenses.

Figure 8A:
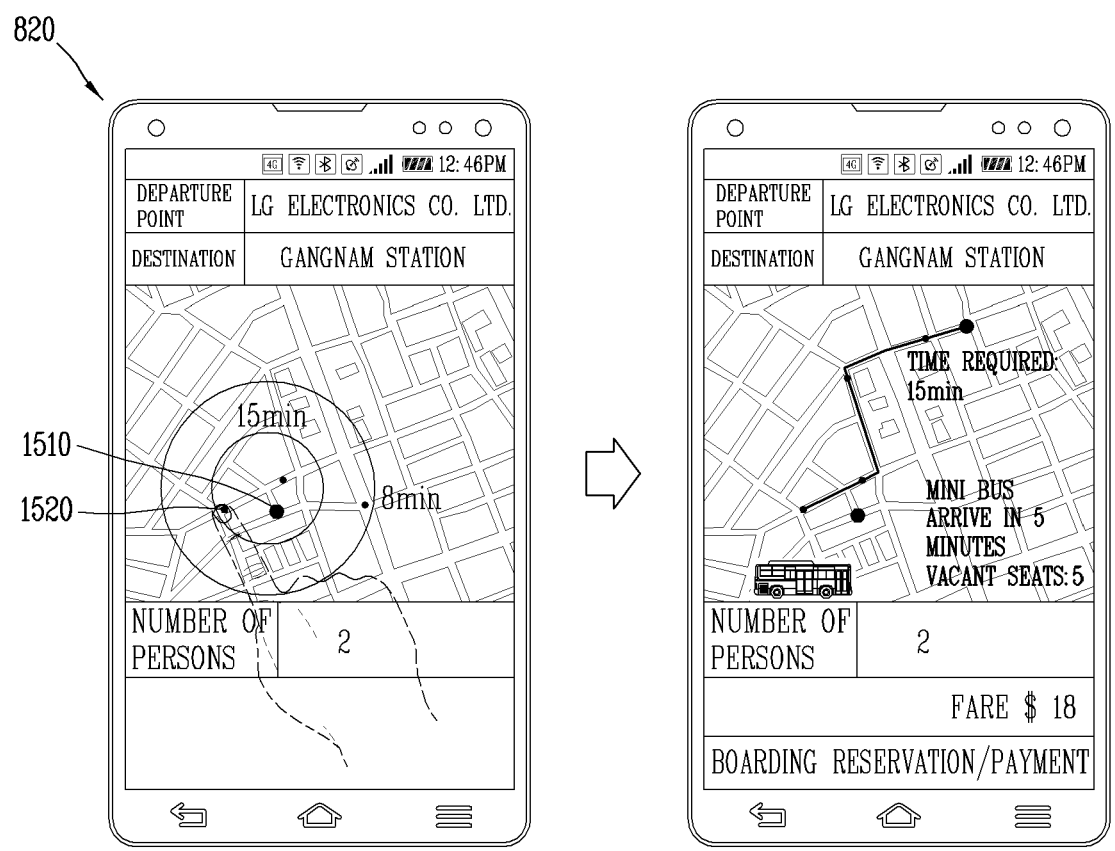
FIGS. 8A and 8B are exemplary views illustrating a user interface provided from a passenger terminal when a boarding request is received.
Figure 8B:
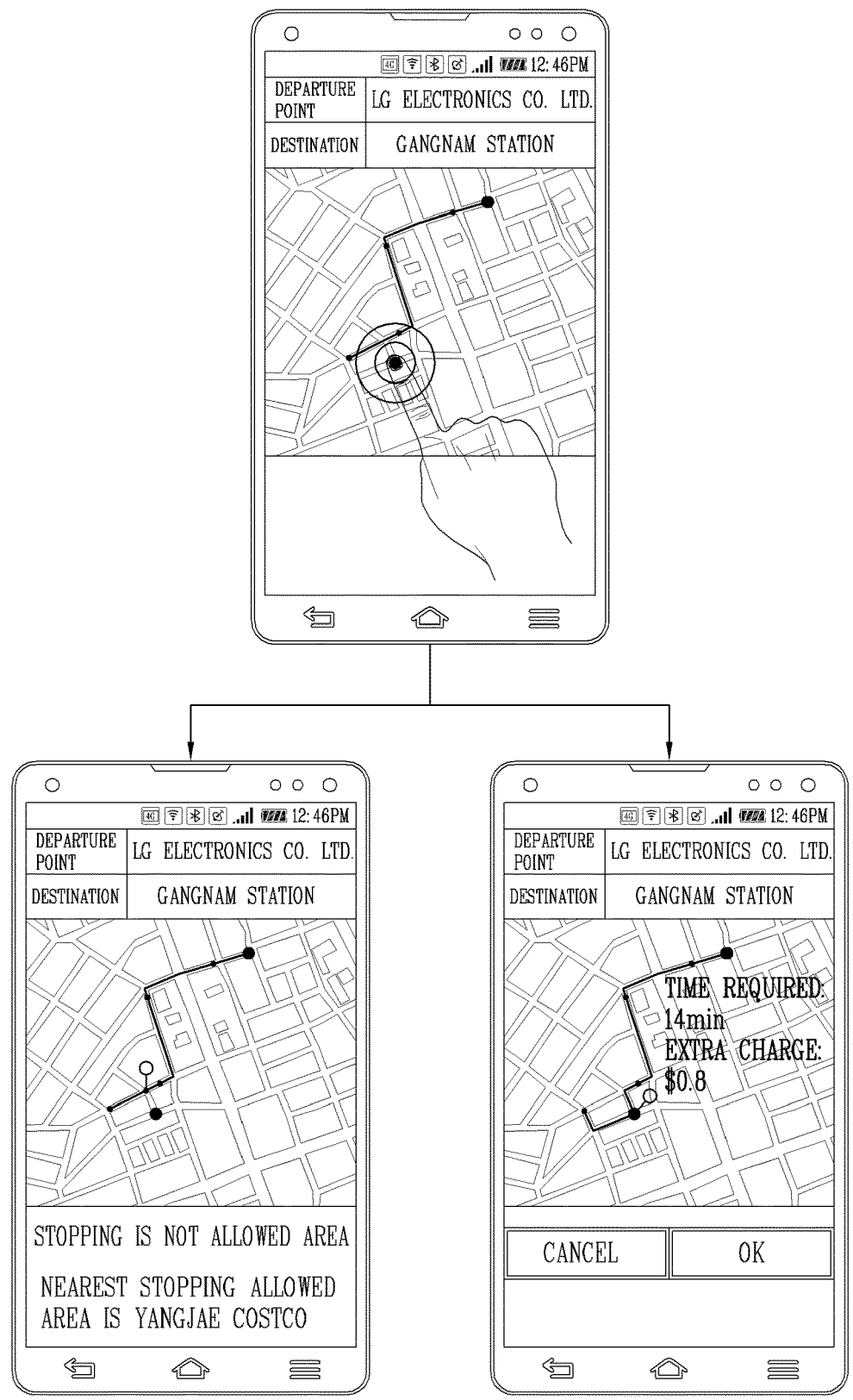

FIGS. 8A and 8B are exemplary views illustrating a user interface provided from a passenger terminal when a boarding request is received.

As shown in FIGS. 8A and 8B, an execution screen of a passenger application 822 is displayed on a display of the passenger terminal 820. The execution screen includes a map image, and a position icon 1510 informing the current position of the passenger terminal 820 on the map image. Moreover, the execution screen may include a user interface configured to input a destination or the number of passengers.

The passenger terminal 820 sets at least one condition based on a user input that is input through the user interface, and transmits the set condition to the server 810. The server 810 searches at least one vehicle based on the condition, and transmits information on the regular route of the searched vehicle 840 to the passenger terminal 820.

The passenger terminal 820 may inform at least one stop 1520 that may receive a transportation service to the destination, based on the information received from the server 810. When at least one stop 1520 is selected, service information of a vehicle that will provide a transportation service to the destination may be displayed. The service information may include information on at least one of an image of a vehicle indicating an external appearance, an expected arrival time of the vehicle, a remaining seat, a movement path to the destination, a use fare, and a seat that a reservation is available.

In addition, as shown in FIG. 8B, a stop addition request may be generated at the passenger terminal 820 with respect to a spot where a stop does not exist. For instance, when a long touch is applied to a spot where a stop does not exist, a stop addition request may be generated with respect to the spot where the long touch is applied.

In this instance, as shown in FIG. 5, it is determined whether the existing stop may be used, and when the existing stop is available to be used, notification information to move to the existing stop may be displayed.

When a new third stop is added to the regular route instead of the existing stop, notification information guiding to the third stop may be displayed on the display of the passenger terminal 820.

When the third stop is generated at one spot on the existing route, additional fee does not occur, but when the existing route should be changed (or, when the third stop is generated at a spot that is not the one spot on the existing route) as the third stop is newly established, additional fee may be generated. When the additional fee is generated, it may be included in the notification information. The additional fee may be calculated in proportion to a distance of a route that is newly added.

A person who desires to use the transportation service can easily and quickly request a vehicle through the passenger terminal 820 of his own, and also can request an addition of a new stop as well.

In addition, the vehicle 840 performs an autonomous driving along a regular route generated by the server 810. Described in detail will be a method for controlling a vehicle of an application that provides a transportation service installed in the vehicle 840, with reference to FIG. 9.

Figure 9:
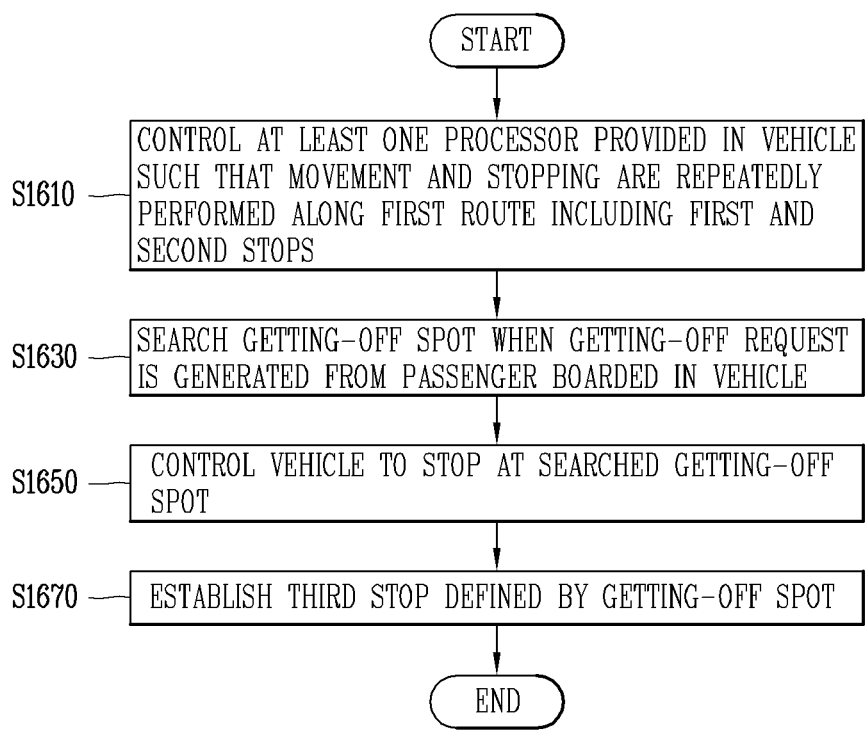
FIG. 9 is a flowchart illustrating a control method of a vehicle that performs an autonomous driving along a regular route according to an embodiment of the present disclosure.

FIG. 9 is a flowchart illustrating a control method of a vehicle that performs an autonomous driving along a regular route, and FIG. 10 is a conceptual view illustrating a method to inform a new stop when the new stop is newly established. The control method described in FIG. 9 is performed through an application installed in the vehicle 840, and the application may be executed by at least one processor provided in the vehicle 840. The application may be the vehicle application 842 that has been described in FIG. 1. Here, "installed in the vehicle 840" may mean that it is installed in an operation system that controls at least one hardware provided in the vehicle 840, or that it is stored in a memory provided in the vehicle 840.

At least one processor provided in the vehicle 840 is controlled such that a movement and stop is repeatedly performed along a first route including first and second stops (S1610). The vehicle 840 moves along a first route by an autonomous driving, and stops at one of the first and second stops such that a passenger may board.

A driving lane and/or a driving speed of the vehicle 840 may be varied according to the driving information, but the driving direction follows the first route. And when arriving at the first and second stops, the vehicle 840 performs stopping for a predetermined time. The predetermined time may be changed according to embodiments, and may be extended until passengers who made a reservation to board are boarded in the vehicle 840.

Next, when a getting-off request is generated from the passenger who has been boarded in the vehicle, a getting-off spot is searched (S1630). The getting-off request may be input to the vehicle 840 through various media. For instance, a voice command such as "let me get off here" may be received through a microphone provided in the vehicle 840. In another instance, a touch input and/or a push input corresponding to a getting-off request may be received through a touch screen and/or a push button (or a bell) provided in the vehicle 840. For still another instance, a getting-off message may be received to the vehicle 840 from a passenger terminal possessed by a passenger. In other words, the getting-off message may be generated by a passenger terminal possessed by a passenger and then received by a communication unit of the vehicle 840.

When the passenger terminal 820 senses that a user boards in a vehicle 840, the passenger terminal may provide a menu or a getting-off icon that can generate the getting-off message. The getting-off icon may disappear from the display of the passenger terminal according to whether the user boards in the vehicle 840. When a touch is applied to the getting-off icon, the passenger terminal may generate a getting-off message and transmit it to the vehicle 840 or the server 810.

The getting-off message may include a predetermined spot where a getting-off is requested. For instance, when a getting-off request is generated by pressing a push button provided in the vehicle 840, the predetermined spot is not included, and the application may set the current position of the vehicle 840 as the predetermined spot. In another instance, when a voice, "let me get off over there" is received, a place where the passenger makes a gesture may be searched, and the searched spot may be set as the predetermined spot.

Further, when the latitude and longitude are input, an address is input, a phone number that can specify an address is input, and one spot on the map is specified, it corresponds to a case that a predetermined spot is included.

When a stop included in the regular route exists within a reference range based on the predetermined spot, the application sets the corresponding stop as the getting-off spot.

Further, when a stop included in the regular route does not exist, a spot that is not a stop may be set as the getting-off spot. In this instance, the application may search a stopping allowed area where the vehicle 840 can stop within the reference range based on the predetermined spot, and set one spot of the stopping allowed area as the getting-off spot. To do this is to consider a passenger's safety and prohibit the vehicle from making any illegal behavior.

When the predetermined spot where a getting-off is requested is included in a getting-off request, the stopping allowed area may be searched based on the predetermined spot, and when the predetermined spot is not included, the stopping allowed area may be searched based on the vehicle.

The getting-off spot may be varied according to at least one of a type of the vehicle 840 and the characteristics of a passenger. For instance, when the vehicle 840 is a 45-seater bus or a 2-seater car, different getting-off spots may be searched. In another instance, when the passenger is a handicapped person, a spot satisfying a getting-off condition of the handicapped person may be set as a getting-off spot.

Next, the vehicle application 842 controls the vehicle 840 to stop at the searched or set getting-off spot. A notification message informing a getting-off may be output before stopping at the getting-off spot. When a reference time or a reference distance to the getting-off spot remains, the getting-off message may be output.

The getting-off notification message may include at least one of the getting-off spot, a distance to the getting-off spot, a fare to be charged in getting-off, and a name of the stop at the getting-off spot. The getting-off notification message may be output through a microphone installed in the vehicle 840, or a display or speaker provided in the passenger terminal 820 of a passenger who is scheduled to get-off.

When any one passenger among plural passengers boarding in the vehicle 840 generates a getting-off message, a notification message informing a getting-off may be output to a passenger terminal of the any passenger who requested a getting-off. For instance, the server 810 may transmit a command for outputting a getting-off message to the passenger terminal 820 before the vehicle 840 stops at the getting-off spot. In another instance, the passenger terminal 820 may calculate a remaining distance to the getting-off spot and/or a remaining time, and output a notification message before stopping at the getting-off spot. For still another instance, the vehicle 840 may transmit a command for outputting a getting-off notification message to the passenger terminal 820 before stopping at the getting-off spot.

In addition, the application may establish a third stop defined by the getting-off spot (S1670). This is because stopping and getting-off are frequently and repeatedly generated at the spot where the passenger requests a getting-off, the getting-off spot is added as a new stop to consistently attract passengers.

The application may establish a third stop by itself, or request the server 810 to establish a third stop. Hereinafter, though a description will be given as an example of a case where a third stop is established by the application for explanation purposes, but the server 810 may establish the third stop instead of the application.

The application may add the third stop to the existing regular route, by searching a candidate stop in response to the getting-off request, and adding the searched candidate stop to the regular route as the third stop.

When plural candidate stops are searched, the application may select any one candidate stop using a history that boarding and getting-off are executed previously. The histories are managed by big data, and any one candidate stop, which has the highest probability of use by passengers according to the statistics of the history, may be selected.

The application may generate a new route including the third stop. Specifically, the application may generate a second route including the first and second stops, and the third stop defined by the getting-off spot. In this instance, the application may control the vehicle 840 to repeatedly move and stop along the second route instead of the first route. When the second route is generated, the driving path of the vehicle 840 may be varied compared to the first route, and information on the second route may be transmitted to and stored in the server 810.

In addition, when a third stop is added or a new regular route is generated, the application may display a route image informing the third stop and/or the new regular route on the display provided in the vehicle 840. For instance, as shown in FIG. 10, the vehicle 840 may include a display 1710. A map image may be displayed on the display 1710, and at least one of a text, graphic object and video that inform a location of the third stop, may be displayed on the map image.

Moreover, the application may transmit related information to the passenger terminal such that the third stop and/or the route image may be displayed on the display 1720 of the passenger terminal of the passenger boarded in the vehicle 840.

The application may share position information with terminals which are located within a predetermined radius, and search at least one terminal of the same position information while the vehicle 840 is moving. When at least one terminal is searched, the searched terminal is regarded as the terminal of the passenger boarded in the vehicle 840, and transmit the third stop and/or the route image to the searched terminal.

Since the server 810 relays the vehicle 840 that will provide a transportation service and the passenger terminal 820, it is possible to determine whether the passenger terminal 820 is located within the vehicle 840, based on information received from the vehicle 840 and the passenger terminal 820. When the passenger terminal 820 is located within the vehicle 840, related information may be transmitted to the passenger terminal 820 such that the route image and/or the third stop may be displayed on the passenger terminal 820.

As described above, the vehicle 840 may not only help a passenger get off from or board in a vehicle by stopping at a position desired by the passenger, but add the position to a new stop. By adding the new stop, a passenger may consistently use the spot where he got off or boarded.

Figure 11A:
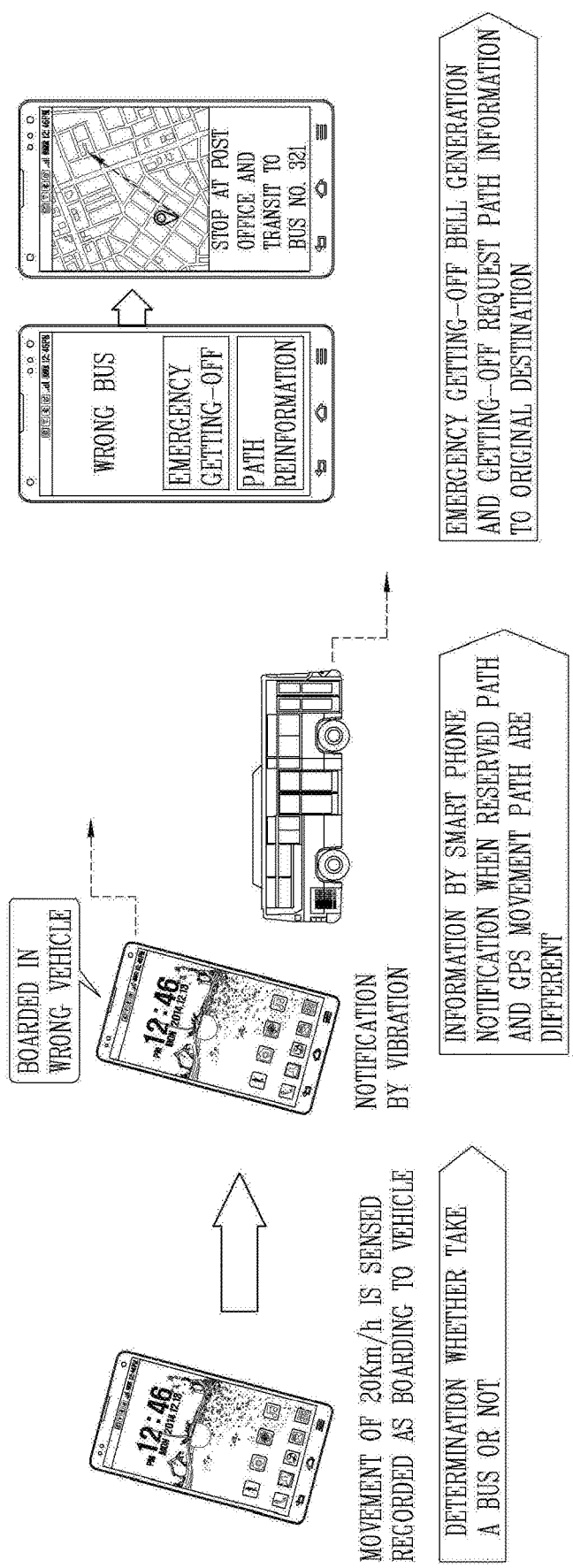
FIGS. 11A through 11C are conceptual views illustrating examples of a transportation system that provides a transportation service according to an embodiment of the present disclosure.
Figure 11B:
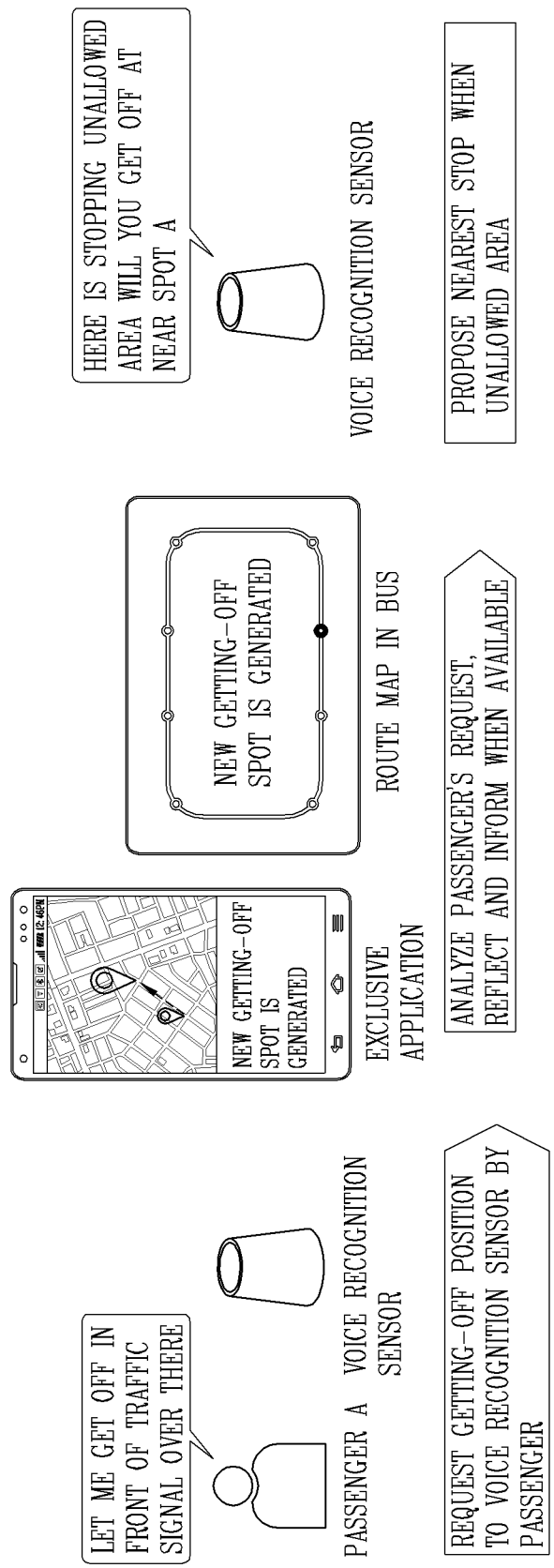
Figure 11C:
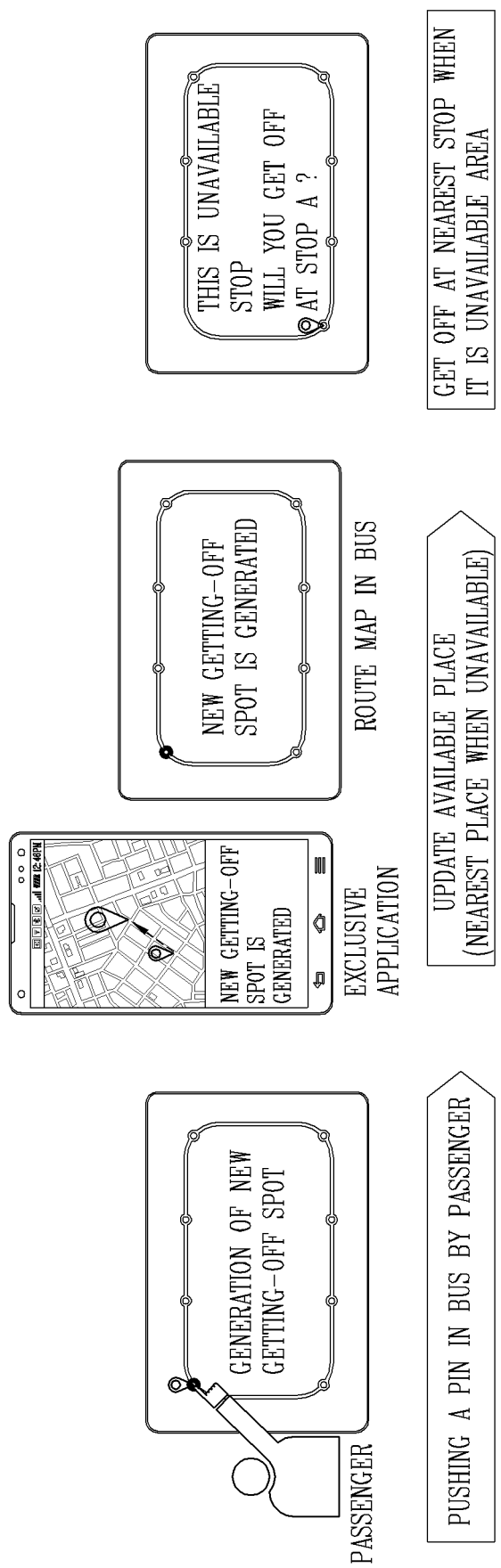

FIGS. 11A through 11C are conceptual views illustrating examples of a transportation system that provides a transportation service. An embodiment for providing a transportation service will be described in more detail with reference to FIGS. 11A through 11C, using the passenger terminal 820 requesting a transportation service to move toward a predetermined destination, the vehicle 840 providing a transportation service to the passenger terminal 820, and a server 810 that relays the passenger terminal 820 and the vehicle 840.

As shown in FIG. 11A, when a movement that exceeds a reference speed (for instance, 20 km/h), the passenger terminal 820 may transmit a boarding confirmation request to the server 810 and/or the vehicle 840. In other words, a movement speed of the passenger terminal 820 is calculated using the position information like GPS, and when the speed is in excess of the reference speed, it is checked whether a user boards in the vehicle 840.

In response to the boarding confirmation request, the server 810 and/or the vehicle 840 compares a movement path of the vehicle 840 and that of the passenger terminal 820, and determines whether a user of the passenger terminal 820 correctly boards in the vehicle 840. When the user of the passenger terminal 820 does not board in the vehicle 840, the passenger terminal 840 outputs a notification message informing boarding of an incorrect transportation means. The notification message may be output in at least one of visual, aural and tactile manners.

Moreover, the passenger terminal 820 may display an emergency getting-off icon to a display of the passenger terminal 820 such that the vehicle in which the passenger boards may stop. When a touch is applied to the emergency getting-off icon, the passenger terminal 820 transmits a stopping request to the vehicle in which the passenger is boarded, and the vehicle may stop at a predetermined spot in response to the stopping request. The passenger terminal 820 may output a replacement path from the predetermined spot to a predetermined destination together with a map image.

In addition, when the passenger terminal 820 correctly boards in the vehicle 840, the passenger terminal 820 may display a path image informing an operation path of the vehicle 840 to a display of the passenger terminal 820.

The vehicle 840 receives an image through a camera provided in the vehicle 840, and determines whether a passenger sits down on a seat using the image. When a seat is reserved by a reservation, it is determined whether a passenger sits down on the reserved seat. The vehicle 840 maintains a stopping state until a passenger sits down on a seat, and starts an autonomous driving when taking a seat is completed.

The vehicle 840 may output an attention image informing guidelines in an autonomous driving to a display of the vehicle 840. Further, the vehicle 840 may output a welcoming image welcoming a boarding of the passenger to the display of the vehicle 840. The welcoming image may include at least one of a name and a profile photo as personal information of the passenger received from the server 810. Once a reproduction of the attention image and/or the welcoming image is completed, then an autonomous driving is started, and the vehicle 840 may maintain a stopping state while the reproduction is proceeded.

When an autonomous driving is started in a state that a passenger is boarded, the vehicle 840 searches a getting-off spot in response to a passenger's getting-off request. The vehicle 840 may receive an input of the getting-off request in various manners. For instance, as shown in FIG. 11B, a voice command such as "Let me get off in front of the traffic lamp over there", may be input through a microphone of the vehicle 840.

The vehicle 840 may classify a predetermined area based on the position where the vehicle 840 is located, into a stopping allowed area and a stopping unallowed area in response to the getting-off request. Otherwise, the vehicle 840 may receive information on the stopping allowed area through the server 810, or search the stopping allowed area from the map data stored in a memory of the vehicle 840. In this instance, the stopping allowed area and the stopping unallowed area may be varied according to a type of the vehicle 840 and the characteristics of the passenger.

The vehicle 840 searches a candidate spot in the stopping area. When the searched candidate spot and the any one stop included in the regular stop of the vehicle 840 are within a reference distance, the any one stop is set as a getting-off spot instead of the searched candidate spot. In another case, the candidate spot is set as a getting-off spot.

When the getting-off spot is set, a getting-off notification message informing a getting-off may be displayed on the display of the vehicle 840. The getting-off notification message may also be displayed on the display of the passenger terminal 820.

When no stop is included within the predetermined area and no stopping allowed area exists, a stop located nearest from the vehicle 840 among the stops included in the regular route of the vehicle 840 may be guided. In addition, the vehicle 840 and/or the passenger terminal 820 may provide a map image informing a stopping allowed area or a stopping unallowed area.

The vehicle 840 may be controlled to stop for a predetermined time at a stop where stopping or boarding of a passenger is reserved among the stops included in the regular route, and to pass a stop where stopping or boarding of a passenger is not reserved. This is intended to prevent a loss of fuel that may occur by stopping of a vehicle at a stop where stopping or boarding of a passenger is not reserved.

Moreover, the vehicle 840 may include a route image that indicates stops included in the regular route of the vehicle 840 on the map image. The stop where stopping is scheduled or the stop where passing is scheduled may be highlighted such that the stop where stopping is scheduled and the stop where passing is scheduled may be discriminated from each other on the route image.

When any one stop is selected on the route image, a getting-off request with respect to the selected stop is generated. When any spot that is not a stop is selected, as shown in FIG. 11C, the vehicle 840 searches a getting-off spot based on the selected spot, and may add the searched spot as a third stop. When the map image and/or the route image is also displayed on the passenger terminal 820, a getting-off spot is selected based on the applied touch, and the selected getting-off spot may be added to the regular route of the vehicle 840 as a third stop.

In providing a transportation service, the server 810 and/or the passenger terminal 840 provides various user interfaces such that a passenger may get off at a desired spot. The vehicle 840 does not stop at any spot in response to the getting-off request, but at a spot where a legal problem does not occur considering a passenger's safety, that is, a spot is set as a getting-off spot in an area where stopping is allowed. The getting-off spot is varied depending on the vehicle 840 and/or the passenger so that a user convenience may be increased.

FIG. 12 is a flowchart illustrating an operation of a vehicle at a getting-off spot. As shown in FIG. 12, when any passenger generates a getting-off request, a vehicle application 842 of the vehicle 840 maintains stopping at a stopping spot in response to the getting-off request (S1910). In this instance, the vehicle application 842 controls the vehicle 840 to stop until the any passenger gets off the vehicle 840.

The vehicle 840 may determine whether the any passenger gets off the vehicle 840 using various sensors provided in the vehicle 840. For instance, the vehicle 840 may analyze an image received from a camera provided in the vehicle 840, and determine whether the any passenger gets off. In another instance, it is possible to determine whether the any passenger gets off the vehicle 840 using a weight sensor provided in the seat of the vehicle 840.

Further, the vehicle 840 may determine whether the any passenger gets off the vehicle 840 by sharing position information with the passenger terminal 820. It is possible to determine whether the any passenger gets off the vehicle 840 based on the position information received from the passenger terminal of the any passenger. Specifically, when a predetermined area is set based on the position of the vehicle 840 and the position of the passenger terminal 820 gets out of the predetermined area, it may be determined that the any passenger gets off the vehicle 840.

After confirming that the any passenger gets off the vehicle 840, the vehicle 840 is controlled to move to a next stop. When a getting off of the any passenger at the getting-off spot is not confirmed until a certain time has passed, the vehicle application 842 may transmit a getting-off confirmation request to the server 810. The server 810 may make a phone call to the passenger terminal 820 or transmit a message requesting a getting-off in response to the getting-off confirmation request. Nonetheless, when a getting-off of the passenger is not confirmed, the vehicle application 842 may control the vehicle 840 to move to a nearest police station or a fire station, regarding it as an emergency situation.

In addition, the vehicle application 842 may determine whether the vehicle 840 is in a state to autonomously drive based on information received from at least one processor provided in the vehicle 840. For instance, when fuel is insufficient to move to the next stop, or at least one sensor is in trouble it may be determined that an autonomous driving is in an unavailable state.

When an autonomous driving is not available, the vehicle application 842 controls the vehicle 840 to stop at one spot where stopping is allowed for a predetermined time. And the vehicle application 842 transmits transit information that may be replaceable to the passenger terminal of the passenger boarded in the vehicle 840, and may output the received transit information. The transit information may include a replacement transportation means and a replacement path for a movement from a stopping spot where the vehicle 840 will stop to destinations of each passenger. The server 810 may move another autonomous driving vehicle to the stopping spot for a transit of the passengers.

Figure 13:
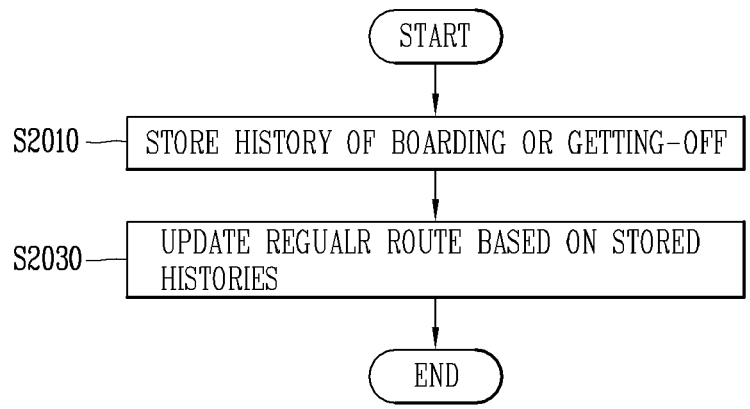
FIG. 13 is a flowchart illustrating an operation of a server that updates a preset regular route according to an embodiment of the present disclosure.

FIG. 13 is a flowchart illustrating an operation of a server that updates a preset regular route. As a transportation service is provided, a boarding history and/or a getting-off history are accumulated and stored. In other words, the server 810 may store the boarding history and/or getting-off history, based on information transmitted from the passenger terminal 820 and/or the vehicle 840 (S2010).

Next, the server 810 may update the regular route of the vehicle 840 based on the stored histories (S2030). For instance, when the number of passengers using a specific stop is smaller than a reference for a predetermined period, the server 810 may delete the specific stop from the regular route. In another instance, when the number of passengers using a specific stop is larger than a reference for a predetermined period, a new vehicle may be assigned to the regular route such that the new vehicle may perform an autonomous driving along the regular route.

The histories may be managed by a big data, and a use rate of passengers may be calculated by the statistics of the histories. The server 810 may add a new stop to the regular route, change a path of the regular route, or delete an existing stop included in the regular route, based on the use rate. Thus, it is possible to provide a transportation service of high efficiency.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A method for controlling a computing device, the method comprising:
registering a vehicle configured to provide a transportation service based on vehicle information received from a driver terminal;
generating a regular route of the vehicle including first and second stops;
transmitting information on the regular route to the driver terminal such that the regular route is displayed on a display of the driver terminal; and
transmitting an autonomous driving command, in response to receiving an approval message to the regular route from the driver terminal, to the vehicle such that the vehicle performs an autonomous driving along the regular route,
wherein the method further comprises:
adding a third stop to the regular route;
transmitting an autonomous driving modification command to the vehicle such that the vehicle traverses the first through third stops in a preset order; and
deleting the third stop from the regular route when a number of passengers using the third stop is smaller than a reference number for a predetermined period.

2. The method of claim 1, wherein the adding the third stop comprises:
receiving a request for adding the third stop to the regular route from a passenger terminal;
searching for a candidate stop based on a predetermined spot included in the request for adding the third stop; and
adding the candidate stop to the regular route as the third stop.

3. The method of claim 2, further comprising:
transmitting a no stop addition message to the passenger terminal based on no candidate stops existing within a reference range of the predetermined spot.

4. The method of claim 1, wherein the first and second stops correspond to a departure point and a destination, respectively, received from the driver terminal, and wherein the generating the regular route further comprises:
calculating a path based on the departure point and destination;
extracting at least one stop located on the path and satisfying a preset condition; and
generating the regular route including the departure point, the destination, and the at least one stop.

5. The method of claim 4, wherein the extracting the at least one stop comprises:
extracting a stopping allowed area where the vehicle is allowed to stop for a predetermined time on the path; and
extracting 'm' stops, using the stopping allowed area, in which an (n+1)th stop included in the regular route is located out of a predetermined range based on an (n)th stop, wherein the 'm' is a natural number larger than a number '2', and 'n' is a natural number smaller than 'm'.

6. The method of claim 5, wherein the 'm' is varied according to the path.

7. The method of claim 4, wherein the preset condition is varied according to a type of the vehicle.

8. The method of claim 4, wherein the route is calculated based on a weekday the vehicle performs the autonomous driving, and wherein the at least one stop is varied according to a change of the path.

9. The method of claim 1, further comprising:
transmitting a standby command to the vehicle such that the vehicle stops at a predetermined spot when a number of people using the regular route is smaller than a minimum reference.

10. The method of claim 1, further comprising:
transmitting replaceable transit information to a passenger terminal of a passenger boarded in the vehicle when the autonomous driving is not possible.

11. A method for controlling a vehicle installed with an application that provides a transportation service, the method comprising:
controlling the vehicle installed with the application such that movement of the vehicle and stopping of the vehicle are repeatedly performed along a first route that includes first and second stops;
searching for a getting-off spot, in response to a getting-off request generated by a passenger boarded in the vehicle; and
controlling the vehicle to stop at the getting-off spot,
wherein the method further comprises:
generating a second route including the first and second stops and a third stop defined by the getting-off spot; and
controlling the vehicle to repeatedly move and stop along the second route instead of the first route.

12. The method of claim 11, wherein the searching for the getting-off spot comprises:
searching a stopping allowed area, where the vehicle is allowed to stop, in response to the getting-off request; and
setting one spot of the stopping allowed area as the getting-off spot.

13. The method of claim 12, wherein the getting-off spot is varied according to a type of the vehicle or characteristics of the passenger.

14. The method of claim 12, wherein the stopping allowed area is searched based on a predetermined spot when the predetermined spot is included in the getting-off request, and is searched based on a location of the vehicle when the predetermined spot is not included in the getting-off request.

15. The method of claim 11, further comprising:
displaying a map image that displays a location of the third stop, when the second route is generated, on a display provided at the vehicle.

16. The method of claim 15, wherein the controlling the vehicle to repeatedly move and stop along the second route instead of the first route comprises:
controlling the vehicle to stop for a predetermined time at a stop where a passenger boarding or a passenger getting-off is reserved among the stops included in the second route, and to pass without stopping at a stop where a passenger boarding or a passenger getting-off is not reserved among the stops included in the second route.

17. The method of claim 16, further comprising:
displaying a route image that displays the stops included in the second route on the display provided at the vehicle,
wherein a stop among the stops included in the second route where stopping is scheduled is highlighted to discriminate from a stop among the stops included in the second route where passing is scheduled.

18. The method of claim 11, wherein the generating the second route includes:
searching for a candidate stop in response to the getting-off request; and
adding the candidate stop to the first route as the third stop.

19. The method of claim 11, wherein different arrival times are preset at each stop included in the second route, and wherein the method further comprises:
regulating a speed of the vehicle, when the vehicle moves from an (n)th stop to an (n+1)th stop, such that the vehicle arrives at the (n+1)th stop at a set arrival time, wherein 'n' is a natural number.

20. The method of claim 11, further comprising:
outputting a notification message to a passenger terminal of the passenger in response to the vehicle being within a reference time to the getting-off spot or a reference distance to the getting-off spot.

21. The method of claim 20, further comprising:
controlling the vehicle to stop at the getting-off spot until the passenger gets out of the vehicle; and
controlling the vehicle to move to a next stop from the getting-off spot after determining that the passenger is out of the vehicle.

22. The method of claim 21, further comprising:
determining the passenger is out of the vehicle based on position information received from the passenger terminal of the passenger.

23. The method of claim 11, wherein the getting-off request is generated from a passenger terminal and is received through a communication unit provided at the vehicle.

24. A method for controlling a computing device that provides information on a transportation service to a passenger terminal, comprising:
registering a regular route of a vehicle, the regular route including first and second stops;
transmitting information on the regular route to the passenger terminal;
adding, in response to receiving a boarding request or a getting-off request with respect to the vehicle from the passenger terminal, a predetermined spot corresponding to the boarding request or the getting-off request to the regular route as a third stop;
transmitting notification information, informing of an addition of the third stop to the regular route, to the passenger terminal;
transmitting an autonomous driving command to the vehicle such that the vehicle traverses the first through third stops in a preset order; and
deleting the third stop from the regular route when a number of passengers using the third stop is smaller than a reference number for a predetermined period.

25. The method of claim 24, wherein the adding the third stop comprises:
providing a map image that displays a stopping allowed area or a stopping unallowed area to the passenger terminal; and
setting the third stop based on input received by the passenger terminal.

26. The method of claim 25, wherein the stopping allowed area or the stopping unallowed area is varied according to a type of the vehicle or characteristics of a passenger associated with the passenger terminal.

* * * * *